United States Patent
Ji et al.

(10) Patent No.: US 8,442,069 B2
(45) Date of Patent: May 14, 2013

(54) SYSTEM AND METHOD TO ENABLE UPLINK CONTROL FOR RESTRICTED ASSOCIATION NETWORKS

(75) Inventors: Tingfang Ji, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 12/419,831

(22) Filed: Apr. 7, 2009

(65) Prior Publication Data

US 2009/0257390 A1 Oct. 15, 2009

Related U.S. Application Data

(60) Provisional application No. 61/044,835, filed on Apr. 14, 2008.

(51) Int. Cl.
*H04J 3/16* (2006.01)
(52) U.S. Cl.
USPC ........... 370/468; 370/338; 370/342; 370/208; 370/332
(58) Field of Classification Search ........................ None
See application file for complete search history.

(56) References Cited

U.S. PATENT DOCUMENTS

| 6,138,024 | A | 10/2000 | Evans et al. |
| 2004/0184438 | A1* | 9/2004 | Terry ........................... 370/349 |
| 2005/0096062 | A1 | 5/2005 | Ji et al. |
| 2007/0115796 | A1* | 5/2007 | Jeong et al. .................. 370/203 |
| 2007/0149249 | A1* | 6/2007 | Chen et al. ................... 455/561 |
| 2008/0026744 | A1* | 1/2008 | Frederiksen et al. ......... 455/425 |
| 2008/0194235 | A1* | 8/2008 | Dalsgaard et al. ............ 455/411 |
| 2009/0196266 | A1* | 8/2009 | Wu et al. ....................... 370/338 |
| 2010/0074230 | A1* | 3/2010 | Ishii et al. .................... 370/336 |
| 2011/0149829 | A1* | 6/2011 | Terry ............................. 370/312 |

FOREIGN PATENT DOCUMENTS

| JP | 2007510385 A | 4/2007 |
| KR | 20060096091 A | 9/2006 |
| WO | WO9839939 A2 | 9/1998 |
| WO | WO2005043948 A2 | 5/2005 |

OTHER PUBLICATIONS

Alcatel; "Handling of RRM in a Decentratised RAN Architecture" 3GPP Draft; R3-060029, 3RD Generation Partnership Project (3GPP), Mobile Competence Centre ; 650, Route Des Lucioles ; F-06921 Sophia-Antipolis Cedex ; France, vol. RAN WG3, no. Sophia Antipolis, France; 20060110, Jan. 4, 2006, XP050158964 pp. 4-5.
International Search Report and Written Opinion—PCT/US2009/040558—ISA/EPO—Aug. 20, 2009.

* cited by examiner

*Primary Examiner* — Duc C Ho
(74) *Attorney, Agent, or Firm* — Stanton Braden

(57) ABSTRACT

Systems and methodologies are described that facilitate resource management in a wireless communication system. Various techniques described herein can enable a network cell in a wireless communication system (e.g. a macro cell) to mitigate the effects of interference on other surrounding network cells (e.g., femto cells embedded within the coverage of the macro cell). For example, a network cell can allocate control resources that overlap control resources of a nearby cell and assign resources within the region of overlap only to users that will not cause substantial interference to the nearby cell. As another example, a network cell can utilize a control channelization that partially coincides with a control and/or random access channelization of a nearby cell. The network cell can subsequently elect not to use the control resources in the coinciding region in order to enable the nearby cell to control the effects of interference though data scheduling.

81 Claims, 16 Drawing Sheets

SYSTEM AND METHOD TO ENABLE UPLINK CONTROL FOR RESTRICTED ASSOCIATION NETWORKS

CROSS-REFERENCE

This application claims the benefit of U.S. Provisional Application Ser. No. 61/044,835, filed Apr. 14, 2008, and entitled "SYSTEMS AND METHODS TO ENABLE UPLINK CONTROL FOR RESTRICTED ASSOCIATION NETWORKS," the entirety of which is incorporated herein by reference.

BACKGROUND

I. Field

The present disclosure relates generally to wireless communications, and more specifically to techniques for resource management in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices.

In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

Because the strength of a signal typically decreases as the distance over which it is communicated increases, a network user can, under various circumstances, exchange substantially strong signals with cells located physically close to the user as compared to cells that are located farther away from the user. However, for various reasons, a user may not communicate with a wireless communication system through the cell closest to the user. For example, due to differences in capabilities of respective cells in the network, a cell closest to a user may be unable to provide a desired service to a user or may only be capable of providing the service with a lesser quality than a cell located further away. As another example, a closest cell to a user may have restricted access such that the user is not authorized to connect to the cell.

In these and other similar situations, signals transmitted from a user to a serving cell for the user can additionally be observed at other cells whose coverage areas include the physical location of the user. Thus, if these cells attempt to communicate using the resources on which the user transmits to its serving cell, substantial interference can result. Accordingly, it would be desirable to implement resource management techniques for a wireless communication system that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein that can comprise identifying a network cell and a set of control resources associated with the network cell; allocating a set of control resources, wherein at least a portion of the allocated set of control resources overlaps at least a portion of the set of control resources associated with the identified network cell; and selecting control resources for subsequent use from among the allocated set of control resources such that the selected control resources are substantially free from interference caused by the set of control resources associated with the identified network cell.

A second aspect described herein relates to a wireless communications apparatus, which can comprise a memory that stores data relating to a neighboring network cell, a set of control resources used by the neighboring network cell, a system frequency band, and at least one terminal. The wireless communications apparatus can further comprise a processor configured to allocate control resources in the system frequency band such that the allocated control resources at least partially overlap the control resources used by the neighboring network cell and to select control resources for assignment to the at least one terminal such that the selected control resources are substantially free from interference from the control resources used by the neighboring network cell.

A third aspect relates to an apparatus, which can comprise means for identifying frequency subbands in use for control transmission at a neighboring cell having a coverage area that overlaps a coverage area associated with the apparatus; and means for allocating frequency subbands for control transmission such that the frequency subbands identified as in use for control transmission by the neighboring cell are allocated only to users outside the coverage area of the neighboring cell.

A fourth aspect relates to a computer program product, which can comprise a computer-readable medium that comprises code for causing a computer to identify an Evolved Node B (eNB) and a set of control resources used by the eNB; code for causing a computer to reserve control resources such that at least a portion of the allocated control resources overlap with the control resources used by the eNB; and code for causing a computer to allocate reserved control resources to at least one user such that control transmissions conducted by the eNB are substantially free from interference caused by control transmissions conducted by the at least one user over the allocated control resources.

A fifth aspect described herein relates to an integrated circuit that executes computer-executable instructions. The instructions can comprise identifying a neighboring cell; reserving a set of control resources from a system bandwidth; and allocating reserved control resources to respective users such that control transmissions conducted by the neighboring cell are substantially free from interference caused by control transmissions by the respective users over the allocated control resources.

Another aspect described herein relates to a method operable in a wireless communication system. The method can comprise identifying an overlap of control resources with a Radio Resource Control (RRC)-configured control region at a neighboring cell disparate from a serving cell; and conducting one or more transmissions using resources in the overlap of control resources such that the one or more transmissions have a reduced interference level due to RRC configuration at the neighboring cell.

A seventh aspect described herein relates to a wireless communications apparatus that can comprise a memory that stores data relating to a set of control resources that overlaps with a RRC-configured set of control resources at a non-serving eNB. The wireless communications apparatus can further comprise a processor configured to conduct at least one communication using the set of control resources stored by the memory such that the at least one transmission has reduced interference due to RRC configuration at the non-serving eNB.

An eighth aspect relates to an apparatus operable in a wireless communication system. The apparatus can comprise means for identifying uplink control resources that overlap with a RRC-configured control region at a neighboring non-serving cell; and means for conducting one or more transmissions on the identified uplink control resources with reduced interference due to RRC configuration at the neighboring non-serving cell.

An additional aspect described herein relates to a computer program product, which can include a computer-readable medium that comprises code for causing a computer to identify control resources that overlap with a RRC-configured control region at a neighboring non-serving cell; and code for causing a computer to perform at least one Physical Uplink Control Channel (PUCCH) transmission on the identified control resources with reduced interference due to RRC configuration at the neighboring non-serving cell.

A further aspect described herein relates to an integrated circuit that executes computer-executable instructions. The instructions can comprise obtaining information relating to a set of control resources that overlaps with a RRC-configured set of control resources at a non-serving eNB; and conducting at least one communication using the set of control resources for which information is obtained such that the at least one transmission has reduced interference due to RRC configuration at the non-serving eNB.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
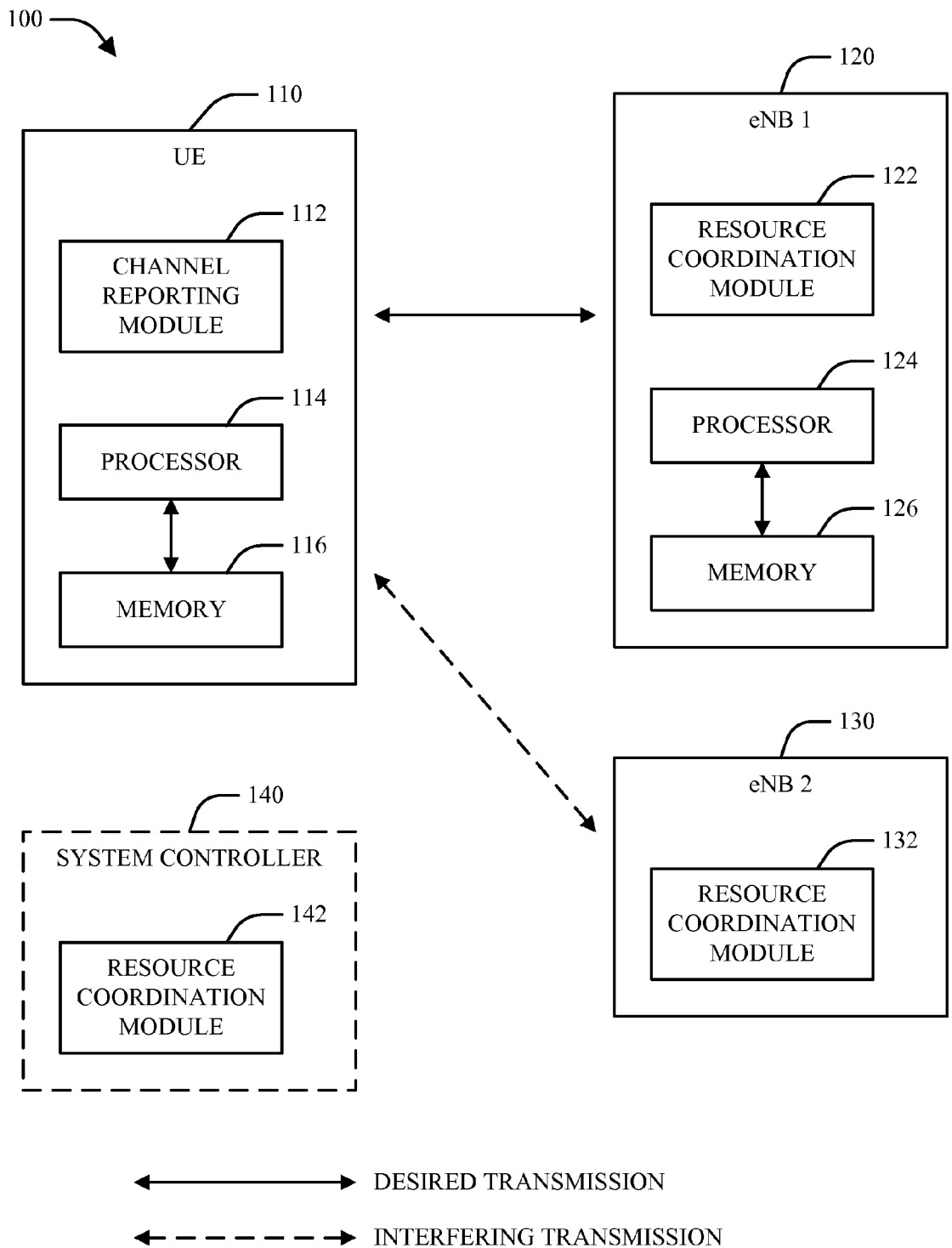
FIG. 1 is a block diagram of a system for coordinating control resources within a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for coordinating control resources within a wireless communication system in accordance with various aspects described herein. As FIG. 1 illustrates, system 100 can include one or more user equipment units (UEs) 110, which can communicate with one or more Evolved Node Bs (eNBs) 120 and/or 130. While only one UE 110 and two eNBs 120 and 130 are illustrated in FIG. 1, it should be appreciated that system 100 can include any number of UEs 110 and/or eNBs 120 and/or 130. Further, it can be appreciated that respective eNBs in system 100 can serve any suitable coverage area, such as an area associated with a macro cell, a femto cell (e.g., an access point base station or Home Node B (HNB)), and/or any other suitable type of coverage area.

In accordance with one aspect, UE 110 can communicate with an eNB 120 designated as a serving eNB for UE 110 (e.g., eNB 120). For example, UE 110 can conduct one or more uplink (UL, also referred to as reverse link (RL)) communications to eNB 120, and eNB can conduct one or more downlink (DL, also referred to as forward link (FL)) communications to UE 10. In the example illustrated by system 100, communications between UE 110 and eNB 120 are illustrated using a solid line. In one example, uplink and/or downlink communication between UE 110 and eNB 120 can additionally result in interference to nearby eNBs, such as eNB 130. For example, if the coverage areas of multiple eNBs in system 100 overlap, a UE located in an area that lies in an overlap between the coverage of multiple eNBs can cause interference to one or more eNBs within range of the UE with which the UE is not communicating under various circumstances. This can occur, for example, in a system that includes femto cells if a UE is located within the coverage area of a femto cell, which in turn is embedded into the coverage area of a macro cell.

In accordance with one aspect, as the strength of a signal generally decreases as the distance over which it is communicated increases, UE 110 can, under various circumstances, exchange substantially strong signals with eNBs 120 and/or 130 located physically close to UE 110 as compared to eNBs 120 and/or 130 that are located farther away from UE 110. However, various factors can cause UE 110 to select an eNB 120 and/or 130 other than an eNB 120 and/or 130 that is closest to UE 110 for communication within system 100. For example, as a result of differences in capabilities of respective eNBs, an eNB closest to a UE may be unable to provide a desired service or may only be capable of providing the service with a lesser quality than an eNB located further away. Such differences in eNB capability could result from, for example, different transmit power levels, backhaul implementations, numbers of antennas utilized, duplexing capabilities (e.g., half-duplex vs. full-duplex), or the like. As another example, a closest eNB to a UE may have restricted access (e.g., the eNB may correspond to a restricted association network) such that the UE is not authorized to connect to the eNB.

In these and other similar situations, signals transmitted from a UE to a serving eNB 120 can interfere with other eNBs 130 whose coverage areas include the physical location of UE 110, which can result in significant outages and/or other adverse effects. Accordingly, one or more eNBs 120 and/or 130 in system 100 can include respective resource coordination modules 122 and/or 132, which can operate to coordinate control resource usage between eNBs 120 and/or 130 in system 100 in order to mitigate the effects of interference between entities in system 100. For example, if eNBs 120 and 130 are configured to utilize overlapping sets of control resources in frequency, resource coordination modules 122 and 132 at eNBs 120 and 130 can facilitate coordination between the overlapping control resources such that transmissions conducted over the overlapping resources from a given eNB do not interfere with communication at another nearby eNB. Specific techniques that can be utilized for resource coordination are provided in further detail infra.

In one example, resource coordination modules 122 and/or 132 at respective eNBs 120 and/or 130 in system 100 can facilitate communication between eNBs 122 and 132 (e.g., via backhaul messaging) to determine various frequency subbands to be utilized by the respective eNBs 120 and/or 130 for control communication and/or respective interlaces in time at which eNBs 120 and/or 130 are to conduct control communications.

In another example, resource coordination modules 122 and/or 132 at one or more eNBs 120 and/or 130 in system 100 can coordinate control resources based on reports provided by a UE 110 via a channel reporting module 112 at UE 110 and/or by other means. For example, UE 110 can identify one or more eNBs 120 and/or 130 that provide service in an area in which UE 110 is located, relative observed signal strengths associated with respective eNBs 120 and/or 130, respective control frequencies in use by respective eNBs 120 and/or 130, and/or other similar information. Based on reported information from a UE, an eNB 120 and/or 130 can then adjust a utilized set of control resources to mitigate interference with other identified eNBs 120 and/or 130.

In a further example, one or more eNBs 120 and/or 130 in system 100 can coordinate control resources with the aid of an external system controller 140. System controller 140 can be, for example, a management server or entity for system 100 and/or one or more areas within system 100. For example, system controller 140 can be a HNB Management Server (HMS) and/or another suitable entity, which can coordinate the use of one or more channels within a given area (e.g. a neighborhood). In one example, system controller 140 can itself include a resource coordination module 142 and/or any other appropriate component(s) for coordinating channel usage among eNBs 120 and/or 130 in system 100, either independently or in cooperation with respective resource coordination modules 122 and/or 132 at eNBs 120 and/or 130. In another example, system controller 140 can communicate with eNBs 120 and/or 130 via backhaul messaging and/or by any other suitable means.

As further illustrated in system 100, UE 110 can include a processor 114 and/or a memory 116, which can be utilized to implement some or all of the functionality of channel reporting module 112 and/or any other component(s) of UE 110. Similarly, FIG. 1 illustrates that eNB 120 can include a processor 124 and/or memory 126 to implement some or all of the functionality of resource coordination module 122 and/or any other component(s) of eNB 120. While only eNB 120 is illustrated as including a processor 124 and memory 126 in FIG. 1, however, it should be appreciated that eNB 130 and/or system controller 140 could additionally or alternatively implement a processor and/or memory in a similar manner.

In accordance with one aspect, resource coordination modules 122, 132, and/or 142 can utilize one or more techniques described infra to partition respective nodes and/or cells (e.g. corresponding to respective eNBs 120 and/or 130) in system 100 such that the nodes utilize different channelization. It can be appreciated that these techniques can be utilized for any scenario in which interference is desirably mitigated, such as, for example, a scenario in which a first node is embedded into the coverage of a second node, a scenario in which a node does not always actively transmits and/or receive and can potentially generate random interference during periods of inactivity, and/or any other scenario.

Figure 2:
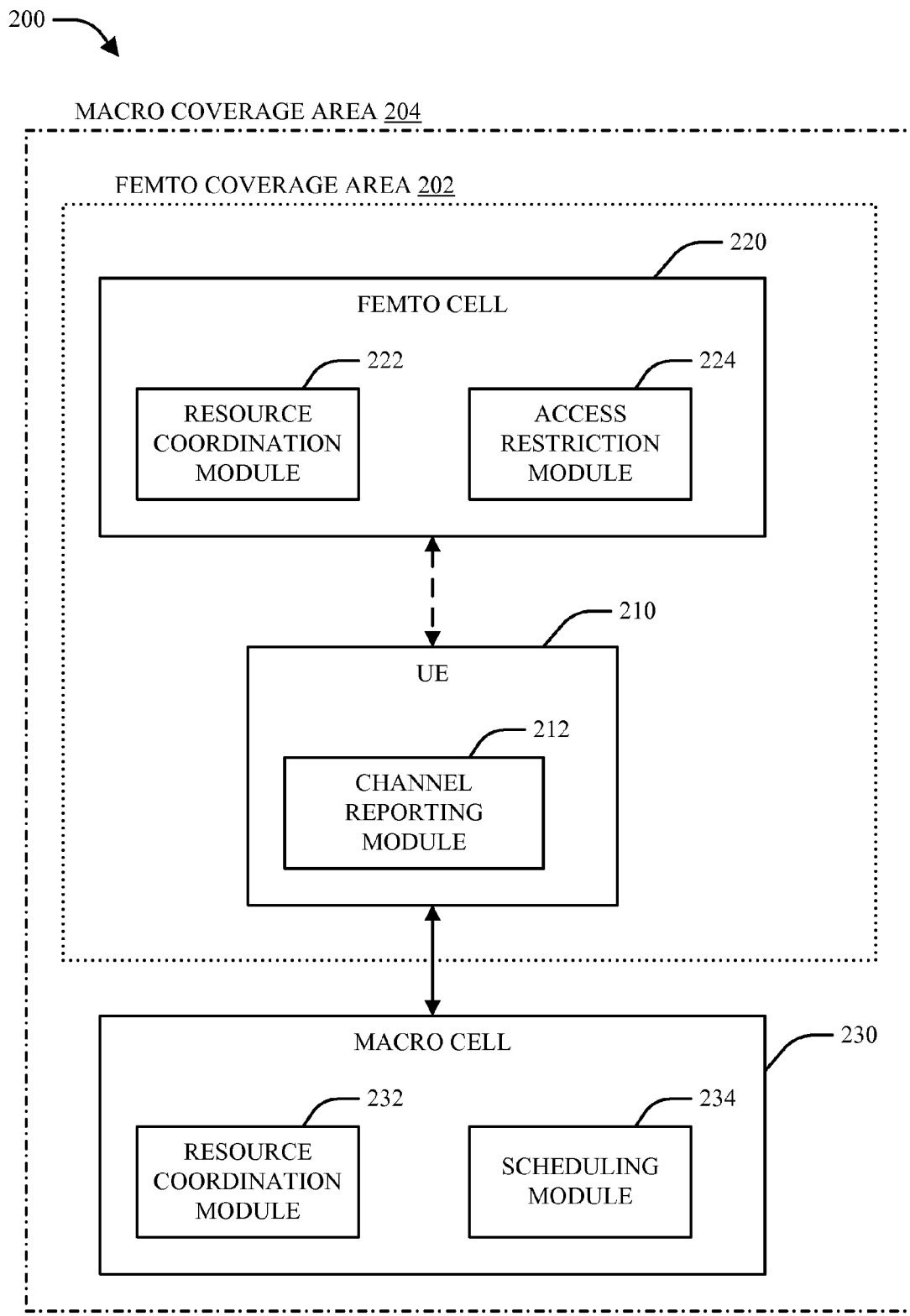
FIG. 2 is a block diagram of a system that facilitates control transmission in a restricted association network in accordance with various aspects.

Turning to FIG. 2, a system 200 that facilitates control transmission in a restricted association network in accordance with various aspects is illustrated. With regard to FIG. 2, it should be appreciated that system 200 is provided merely as an example of a network structure that can utilize the resource management techniques described herein and that, unless explicitly stated otherwise, the claims are not intended to be limited to such a network structure.

As FIG. 2 illustrates, system 200 can include a femto cell 220 having an associated coverage area 202 and a macro cell 230 that is associated with a larger coverage area 204. In one example, the coverage area 202 of femto cell 220 can be embedded within the coverage area 204 of macro cell 230 such that the coverage area 202 of femto cell 220 is entirely contained within the coverage area 204 of macro cell 230. For example, femto cell 220 can provide communication coverage for a user residence and/or a similar area, and macro cell 230 can provide coverage for a group of residences that includes a residence associated with femto cell 220. However, it should be appreciated that the techniques described herein do not require the coverage area 202 of femto cell 220 to be located entirely within the coverage area 204 of macro cell 230 and that the techniques described herein can be used to coordinate resources between cells having any degree of overlap.

In accordance with one aspect, femto cell 220 can be a restricted access network such that only UEs within a closed subgroup (CSG) associated with femto cell 220 are allowed to access femto cell 220. Access control can be performed at femto cell 220 by, for example, an access restriction module 224 and/or any other suitable component associated with femto cell 220. Thus, if a given UE 210 within the coverage area 202 of femto cell 220 is not authorized to access femto cell 220, the UE 210 can be required to instead access a macro cell 230 that also provides coverage for the area in which UE 210 is located. In such an example, UE 210 may be required to conduct communication with macro cell 230 at a high rate of power due to, for example, the large coverage area 204 associated with macro cell 230. However, if UE 210 is located close to femto cell 220 (e.g., within coverage area 202), high-power transmissions from UE 210 to macro cell 230 can cause significant interference and/or outages to femto cell 220 if suitable interference management is not performed.

Accordingly, femto cell 220 and/or macro cell 230 can utilize respective resource coordination modules 222 and/or 232 or any other suitable functionality to coordinate and/or negotiate a resource allocation policy between femto cell 220 and macro cell 230, thereby mitigating the effects of interference on femto cell 220 caused by UE 210 and/or other similarly situated UEs. Additionally or alternatively, femto cell 220 and/or macro cell 230 can leverage an external system management entity (e.g., system controller 140) to aid in resource coordination.

In another example, femto cell 220 and/or macro cell 230 can utilize reports provided by a channel reporting module 212 associated with UE 210 to infer whether UE 210 is causing interference to 220. An inference based on information from channel reporting module 212 can subsequently be utilized to tailor a specific resource allocation to UE 210. In a further example, macro cell 230 can include a scheduling component 234, which can be utilized to schedule transmissions to and/or from UE 210 such that the transmissions substantially avoid causing interference to femto cell 220.

Figure 3:
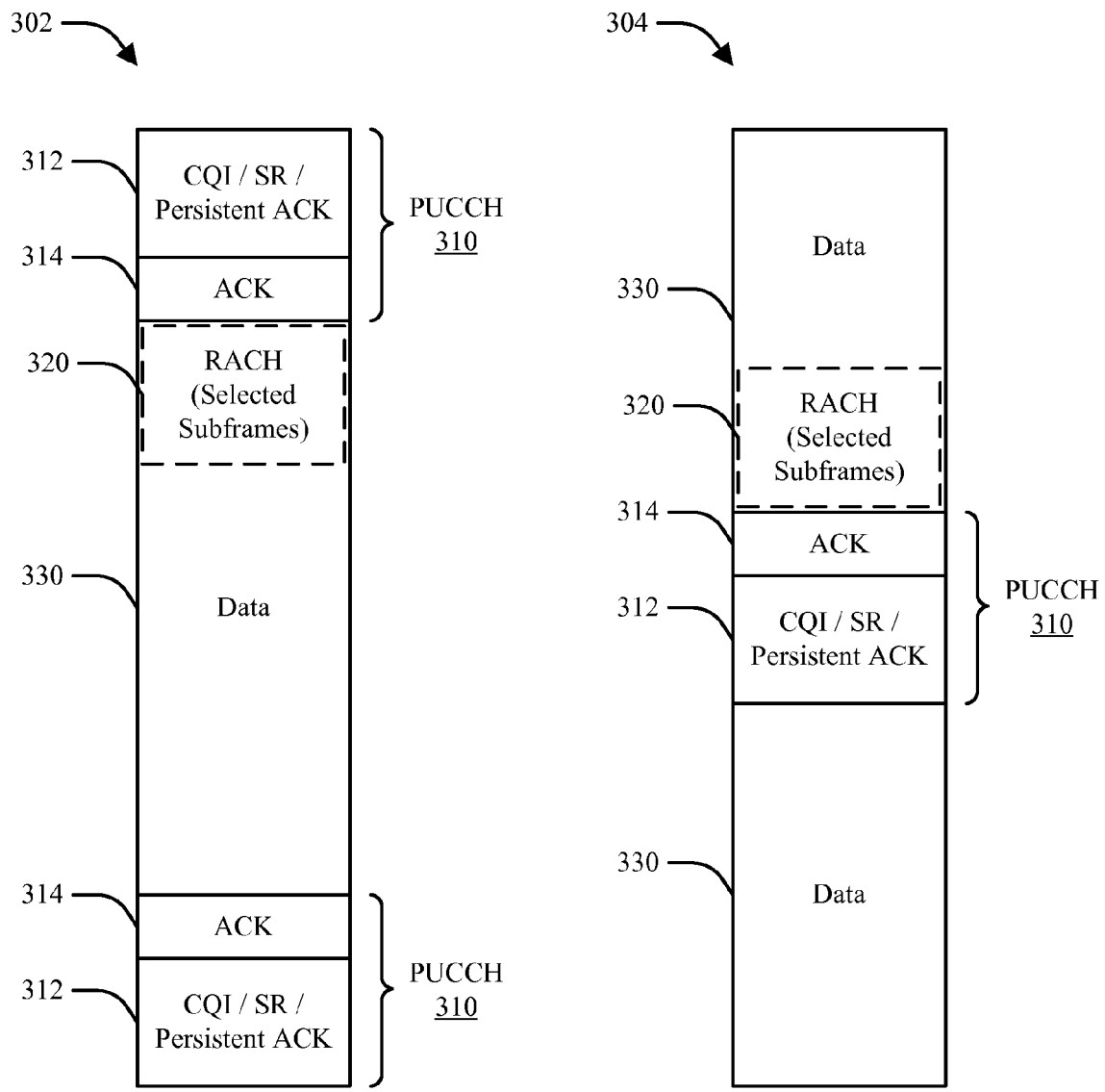
FIG. 3 illustrates example frequency band allocations that can be utilized within a wireless communication system in accordance with various aspects.

Referring now to FIG. 3, a set of diagrams 302-304 are provided that illustrate example frequency band allocations that can be utilized within a wireless communication system in accordance with various aspects. In accordance with one aspect, diagrams 302 and 304 represent uplink channelizations that can be utilized by, for example, systems 100, 200, and/or any other suitable system.

In accordance with one aspect, an uplink channelization utilized by a wireless communication system can include one or more sets of resources 312 allocated for Channel Quality Indicator (CQI), Scheduling Request (SR), and/or persistent acknowledgement (ACK) transmission. In one example, resource set 312 can be combined with one or more ACK channels 314 to form a Physical Uplink Control Channel (PUCCH) 310. As diagram 302 represents, resources for PUCCH 310 can be allocated at one or more ends of a system frequency band. Alternatively, as diagram 304 represents, resources for PUCCH 310 can be allocated at a central region of a system frequency band.

In one example, CQI resource blocks (RBs) can be allocated to predefined locations at the edge of the band or the center of the band, and respective mobile users (e.g., UEs 110 or 210) can be assigned to particular CQI channel(s) using Layer 3 (L3) messages. In another example, configurations for SR and persistent ACK resources can be explicitly signaled to one or more mobile users in a similar manner to CQI resources. Accordingly, it can be appreciated that CQI, SR, and persistent ACK resources configured to be utilized by a given mobile user can be signaled to the user in a single L3 message, such as a Radio Resource Control (RRC) message and/or any other suitable type of message.

In accordance with one aspect, ACK channels 314 can be allocated to RBs adjacent to RBs allocated for CQI such that each ACK channel is mapped to a corresponding Physical Downlink Control Channel (PDCCH) channel element location for scheduled DL data. In one example, allocations of ACK channels 314 to respective users can be dynamically selected and/or changed for a user depending on DL resources utilized to communicate with the user. In accordance with another aspect, Random Access Channel (RACH) resources 320 can be allocated next to resources for PUCCH 310 in the frequency band. While RACH 320 is illustrated at only one end of the system frequency band in diagram 302 and at only one side of the PUCCH allocation 310 in diagram 304, it should be appreciated that RACH 320 can be allocated in any suitable location(s) within a system frequency band. Further, it can be appreciated that RACH 320 can occupy any suitable amount of resources in the system frequency band (e.g., 6 RBs or the like). In accordance with another aspect, remaining resources 330 in the system frequency band can be allocated for data transmission.

Figure 4:
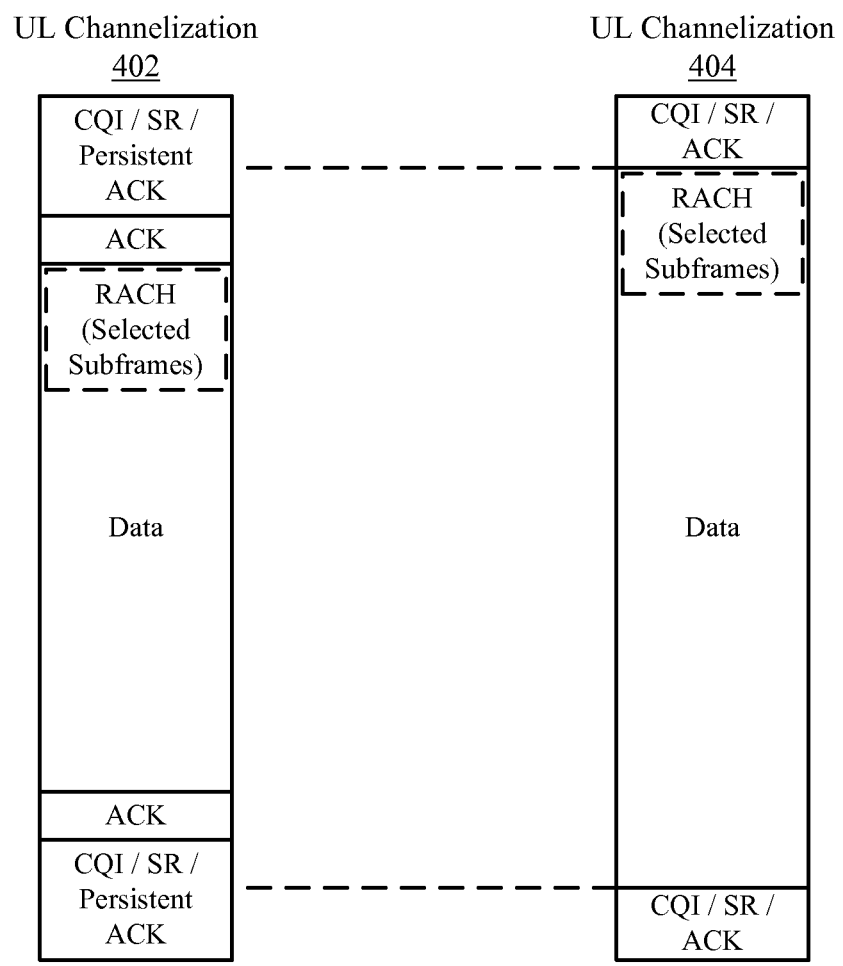
FIGS. 4-6 illustrate example resource management schemes that can be utilized to facilitate control transmission in accordance with various aspects.

Turning now to FIG. 4, a diagram 400 is provided that illustrates a first resource management scheme that can be utilized to facilitate control transmission in a wireless communication system. As diagram 400 illustrates, resource management can be performed to manage interference between two cells in a wireless communication system having respective UL channelizations 402 and 404. In one example, UL channelization 402 corresponds to an unrestricted eNB (e.g., macro cell 230) while UL channelization 404 corresponds to a restricted eNB (e.g., femto cell 220). However, it should be appreciated that any set of two or more cells for which interference is desirably mitigated could utilize the techniques illustrated by diagram 400.

In accordance with one aspect, an eNB corresponding to channelization 402 can allocate a CQI/SR/Persistent ACK channel block such that it spans the UL control channel RBs (e.g., PUCCH) of one or more eNBs corresponding to channelization 404. Accordingly, within the CQI RBs at the eNB corresponding to channelization 402, terminals close to eNBs corresponding to channelization 404 can be allocated only CQI/SR/Persistent ACK channels that are orthogonal to the CQI and/or ACK RBs of the eNBs corresponding to channelization 404.

In one example, a PUCCH allocation can occupy a relatively small portion of UL channelization 404 such as, for example, 1 RB on each side of the frequency band. Accordingly, a larger frequency portion (e.g., 2-3 RBs), can be utilized for CQI/SR/Persistent ACK transmission for UL channelization 402. Based on these resource allocations, an eNB associated with channelization 402 can allocate control resources such that a terminal close to an eNB associated with channelization 404 does not utilize CQI/SR/Persistent ACK resources within the frequency subset allocated within channelization 404. In one example, information collected from respective terminals relating to distance from an eNB associated with channelization 404 can be utilized such that overlapping control resources in channelizations 402 and 404 are only utilized by an eNB associated with channelization 402 for terminals outside the range of an eNB associated with channelization 404. Alternatively, an eNB associated with channelization 402 can instead not utilize overlapping control resources in channelizations 402 and 404 for any terminals, regardless of their location.

Figure 5:
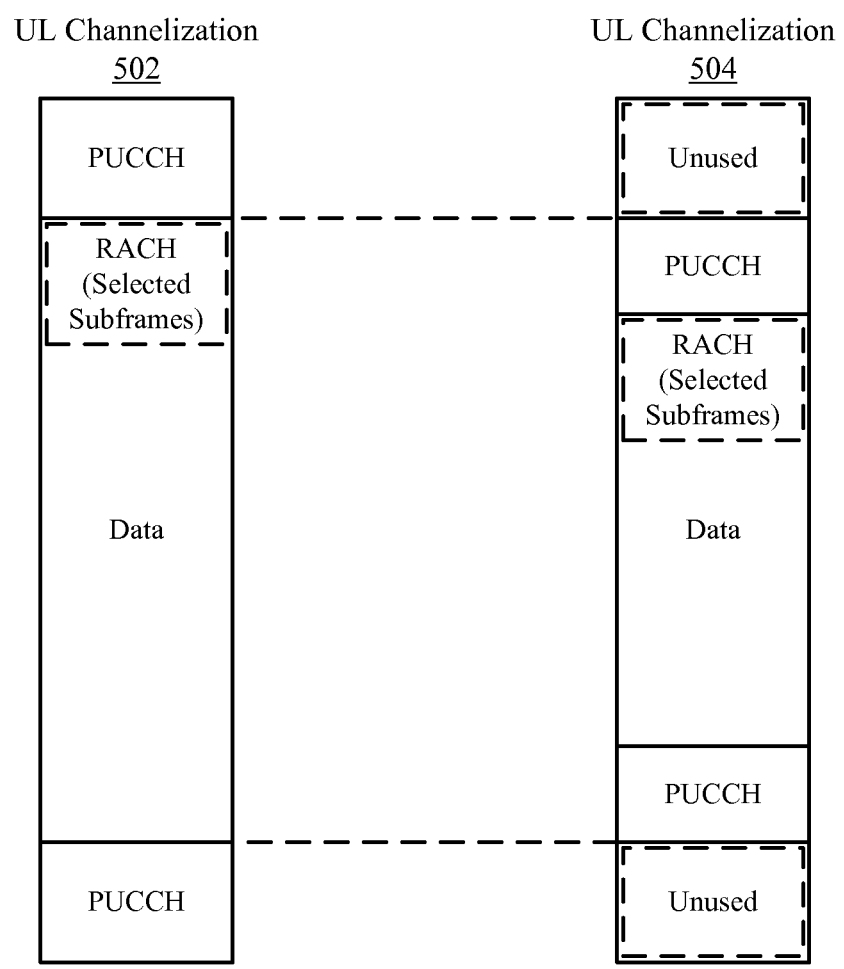

FIG. 5 is a diagram 500 that illustrates a second resource management scheme that can be utilized to facilitate control transmission in a wireless communication system. In a similar manner to diagram 400, resource management can be performed as shown in diagram 500 to manage interference between two cells in a wireless communication system having respective UL channelizations 502 and 504. In one example, UL channelization 502 corresponds to an unrestricted eNB and UL channelization 504 corresponds to a restricted eNB, but it should be appreciated that any set of two or more cells for which interference is desirably mitigated could utilize the techniques illustrated by diagram 500.

In accordance with one aspect, an eNB corresponding to channelization 504 can allocate a PUCCH channel block such that it spans the UL control channel RBs of a neighboring eNB corresponding to channelization 502. As diagram 502 further illustrates, an eNB corresponding to channelization 504 can then only allocate PUCCH channels to respective users that are free of high interference. Thus, for example, a portion of the allocated PUCCH channel block that coincides with UL control channel resources at the eNB corresponding to channelization 502 can be reserved as unused such that no users are allocated resources from those resources.

In accordance with one aspect, PUCCH resources utilized by an eNB corresponding to channelization 504 can coincide with data and/or random access resources used by an eNB corresponding to channelization 502. Accordingly, a scheduler at the eNB corresponding to channelization 502 (e.g., scheduling module 234) can be utilized to schedule data transmissions on the portion of resources that coincides with PUCCH resources allocated at the eNB corresponding to channelization 504 such that the scheduled data transmissions do not cause interference to the control transmissions of the eNB corresponding to channelization 504. Thus, it can be appreciated that the resource management technique illustrated by diagram 500 differs from the resource management technique illustrated by diagram 400, wherein an eNB corresponding to channelization 402 schedules a smaller control block and is required to coordinate its control transmissions with an eNB corresponding to channelization 404 such that there is no overlap. In contrast, it can be appreciated that an eNB corresponding to channelization 502 as illustrated by diagram 500 will instead coordinate its data transmissions such that it is not interfering with control transmissions of an eNB corresponding to channelization 504.

In the specific example where the eNB corresponding to channelization 502 is an unrestricted macro cell and the eNB corresponding to channelization 504 is a restricted femto cell embedded within the macro cell, the macro cell can act as an aggressor to the femto cell in that, due to restricted association, a user associated with the macro cell can approach the femto cell without having access to the femto cell and interfere with signals used by the femto cell. Thus, as illustrated by diagram 400, a macro cell can withhold control transmission such that the femto cell can regulate control resources over its control resource allocation. Alternatively, as illustrated by diagram 500, the femto cell can instead overlap its control resources with the data resources of the macro cell such that scheduling constraints are imposed on the macro cell without impacting control transmissions at the macro cell.

In accordance with another aspect, in the case of RACH interference, the UL control channels at an eNB associated with channelization 504 can be punctured at one or more edges of the spectrum. In one example, the eNB associated with channelization 504 can modify the coding and modulation applied to PUCCH to take the effect of this puncturing into account.

Figure 6:
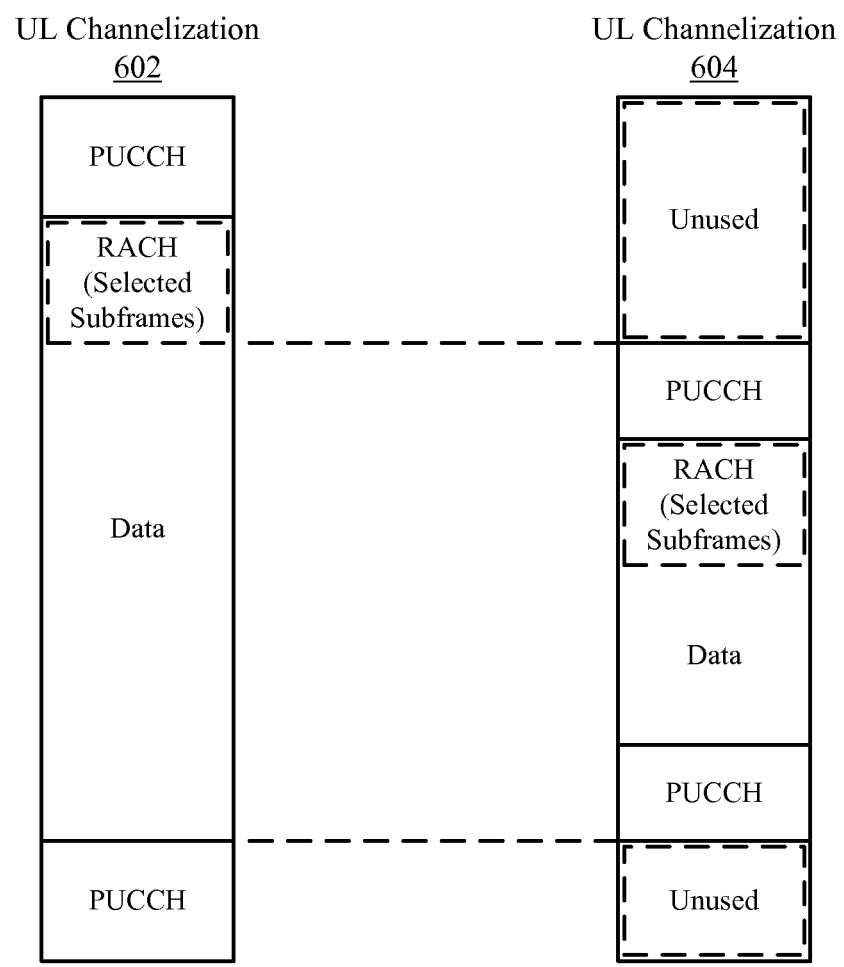

Referring next to FIG. 6, a diagram 600 is provided that illustrates a third resource management scheme that can be utilized to facilitate control transmission in a wireless communication system. As diagram 600 illustrates, resources can be allocated by an eNB corresponding to channelization 604 in a similar manner to that shown in diagram 500 in order to avoid control signaling associated with an eNB associated with channelization 602. In addition, as diagram 600 further illustrates, additional control resources can be reserved as unused as shown in channelization 604 to avoid RACH signaling allocated in channelization 602. While diagram 600 illustrates that uneven reservations can be made along respective edges of a frequency band in order to avoid RACH signaling, resource reservations at respective edges of the frequency band can be equal in size and/or allocated in any other suitable manner. Further, with respect to diagrams 400-600, it should be appreciated that control channel signaling can occupy any suitable portion of the associated system frequency band.

Figure 7:
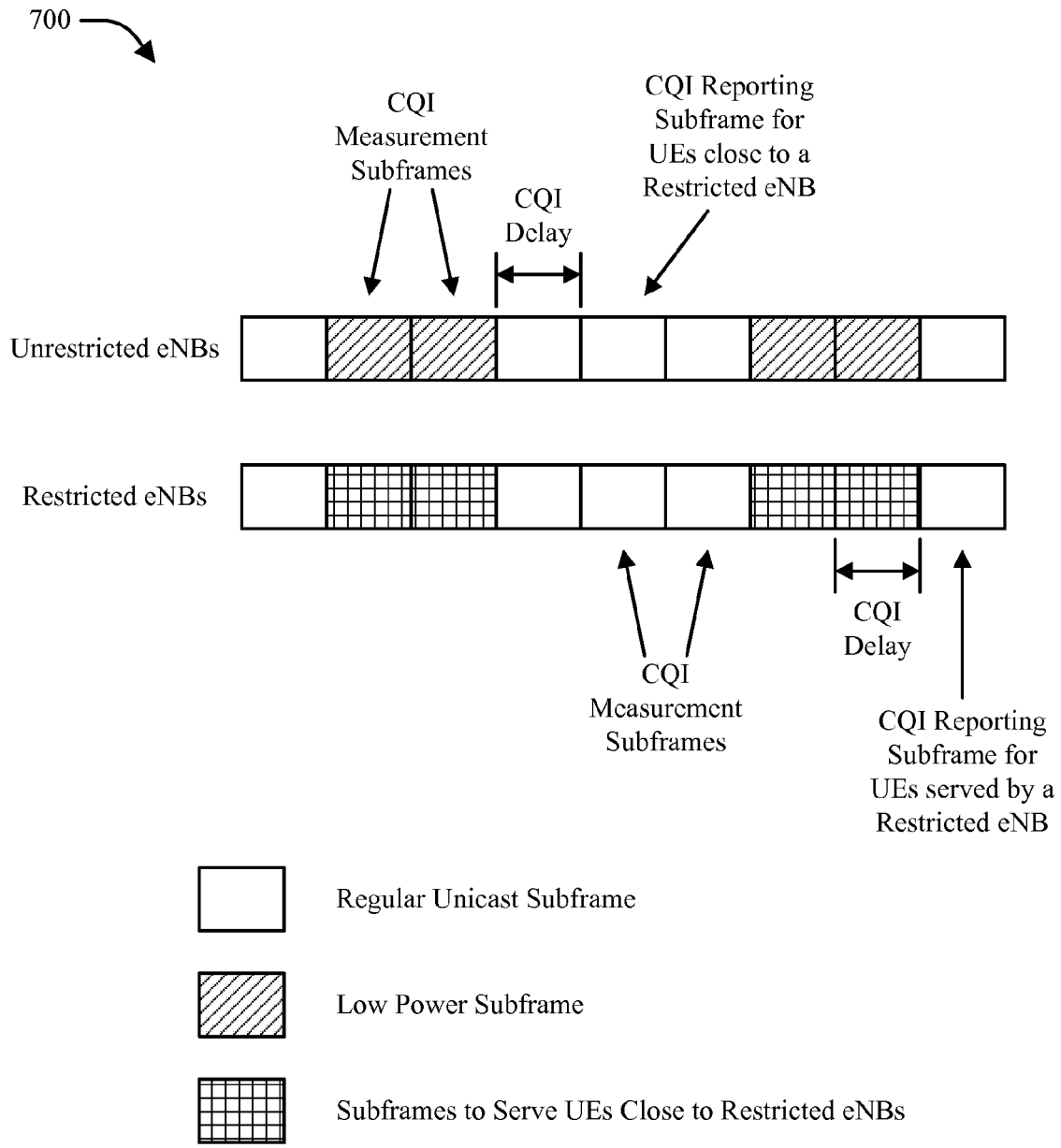
FIG. 7 illustrates an example channel quality reporting and measurement technique that can be utilized in accordance with various aspects.

Turning to FIG. 7, a diagram 700 is provided that illustrates an example technique for CQI measurement and reporting that can be utilized (e.g., by a UE 110) in accordance with various aspects. In accordance with one aspect, the techniques illustrated by diagram 700 can be utilized in the case of synchronous networks to coordinate DL transmissions between unrestricted and restricted base stations by configuring low power subframes at the restricted base stations. In one example, low power subframes can be in the form of a Multimedia Broadcast Multicast Service (MBMS) over a Single Frequency Network (MBSFN), where only the first symbols (e.g., the first 1-2 symbols) are transmitted. In another example, low power subframes can be created by unrestricted eNBs sending signals with a very low power.

In accordance with one aspect, resource alignment can be performed in the time domain such that some subframes exhibit higher interference than other subframes. For example, in order for an unrestricted eNB to serve a UE that comes close to a restricted eNB, the unrestricted eNB can be required to spare the restricted eNB resources in frequency, time, or the like. This can be accomplished using low-power transmissions using MBSFN and/or other suitable techniques, wherein only a small fraction of respective subframes carry information. Accordingly, when a UE reports its channel condition, the unrestricted serving eNB for the UE can be configured as shown in diagram 700 to take into account the operation of the restricted eNB. In a first example, subframes for resource coordination can be identified by a UE by determining low power subframes reserved by an unrestricted eNB through CQI reporting and/or other means. Additionally or alternatively, subframes for CQI reporting can be scheduled at a UE by its serving eNB.

In accordance with another aspect, in order to provide reliable CQI information, CQI measurements can be limited to a subset of DL subframes. For example, UEs served by restricted eNBs can skip over lower power subframes for CQI measurement, as the pilot density and interference levels are different from the projected data transmissions. Additionally or alternatively, UEs that are served by unrestricted eNBs and are close to a restricted eNB can be scheduled to measure subframes that correspond to low power subframes at the restricted eNBs.

Diagram 700 illustrates an example CQI measurement scheme that corresponds to a 1 subframe delay and a 2 subframe measurement period. It should be appreciated, however, that any suitable delay and/or measurement period can be utilized. As shown in diagram 700, UEs close to a restricted eNB (e.g., a restricted femto cell) can be allocated a particular CQI reporting subframe that corresponds to a desired set of measurement subframes. As diagram 700 further shows, UEs in the coverage area of the restricted eNB can skip over the low power subframes for CQI measurement.

As diagram 700 further illustrates, CQI reporting can be configured using a CQI delay and CQI management period such that if a UE is instructed to report CQI at a given time it will perform measurements in a predetermined manner. Thus, CQI reporting can be configured in accordance with one aspect such that no channel measurement is conducted by UEs served by a restricted eNB during times at which transmit power is being lowered for MBSFN subframes or the like.

Referring now to FIGS. 8-12, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 8:
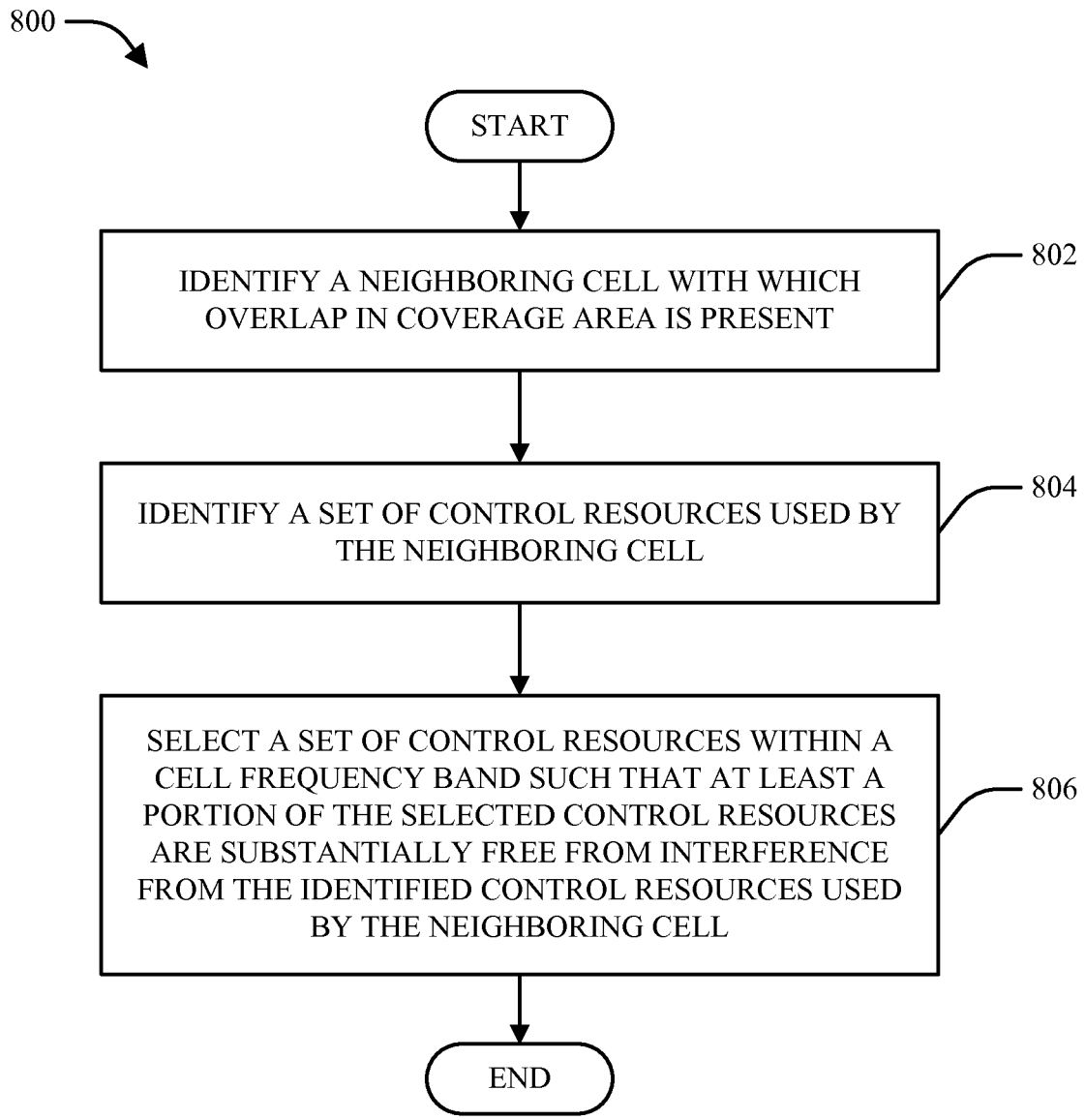
FIGS. 8-10 are flow diagrams of respective methodologies for control resource coordination within a wireless communication system.

With reference to FIG. 8, illustrated is a methodology 800 for control resource coordination. It is to be appreciated that methodology 800 can be performed by, for example, a base station (e.g., eNBs 120 and/or 130), a network controller (e.g., network controller 140), and/or any other appropriate network device. Methodology 800 begins at block 802, wherein a neighboring cell with which overlap in coverage area is present is identified. Next, at block 804, a set of control resources used by the neighboring cell (e.g., corresponding to PUCCH 310) is identified. Finally, at block 806, control resources within a cell frequency band are allocated (e.g. using one or more techniques illustrated by diagrams 400-600) such that at least a portion of the allocated control resources are substantially non-overlapping with the control resources identified at block 804 used by the neighboring cell identified at block 802.

Figure 9:
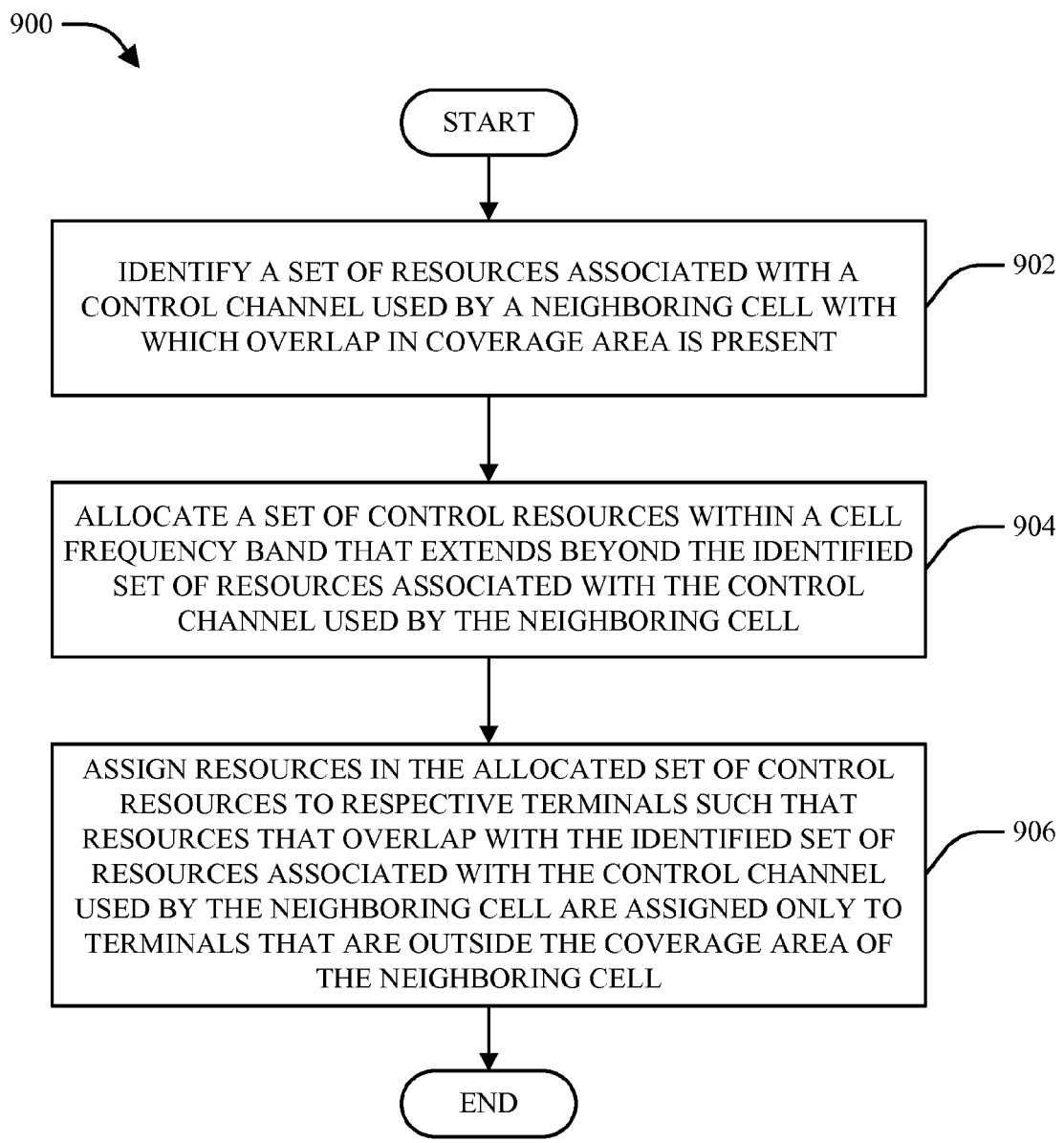

Turning now to FIG. 9, a flow diagram of another methodology 900 for control resource coordination is illustrated. Methodology 900 can be performed by, for example, a network cell (e.g., macro cell 230), a network controller, and/or any other appropriate network entity. Methodology 900 begins at block 902, wherein a set of resources associated with a control channel used by a neighboring cell that overlaps the coverage area of an entity performing methodology 900 is identified. Next, at block 902, a set of control resources within a frequency band associated with the entity performing methodology 900 is allocated that extends beyond the set of resources associated with the control channel associated with the neighboring cell identified at block 902. Upon completing the acts described at block 904, methodology 900 can conclude at block 906, wherein resources in the set of control resources allocated at block 904 are assigned to respective terminals (e.g., UE 110) such that resources that overlap with the set of resources associated with the control channel used by the neighboring cell identified at block 902 are assigned only to terminals that are outside the coverage area of the neighboring cell (e.g., as illustrated by diagram 400).

Figure 10:
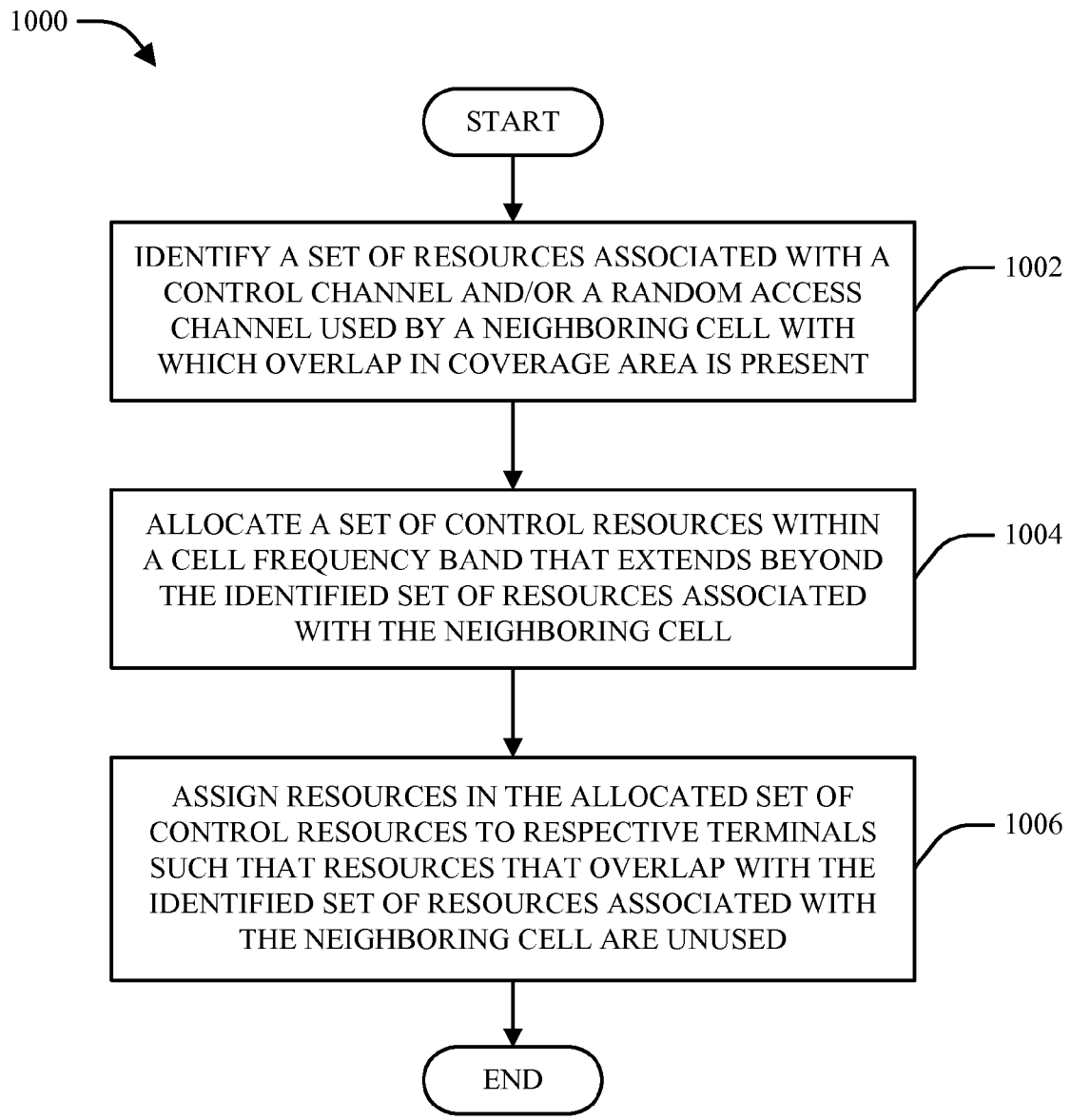

FIG. 10 illustrates a further methodology 1000 for control resource coordination and management. Methodology 1000 can be performed by, for example, an eNB (e.g., femto cell 210), a system controller, and/or any other suitable network device. Methodology 1000 begins at block 1002, wherein a set of resources associated with a control channel (e.g., as shown in diagram 500) and/or a random access channel (e.g., as shown in diagram 600) used by a neighboring cell that overlaps the coverage area of an entity performing methodology 1000 is identified. Following the acts described at block 1002, methodology 1000 continues to block 1004, wherein a set of control resources within a frequency band associated with the entity performing methodology 1000 is allocated that extends beyond the set of resources identified at block 1002. Methodology 1000 can then conclude at block 1006, wherein resources in the set of control resources allocated at block 1004 are assigned to respective terminals such that resources that overlap with the set of resources identified at block 1002 are unused.

Figure 11:
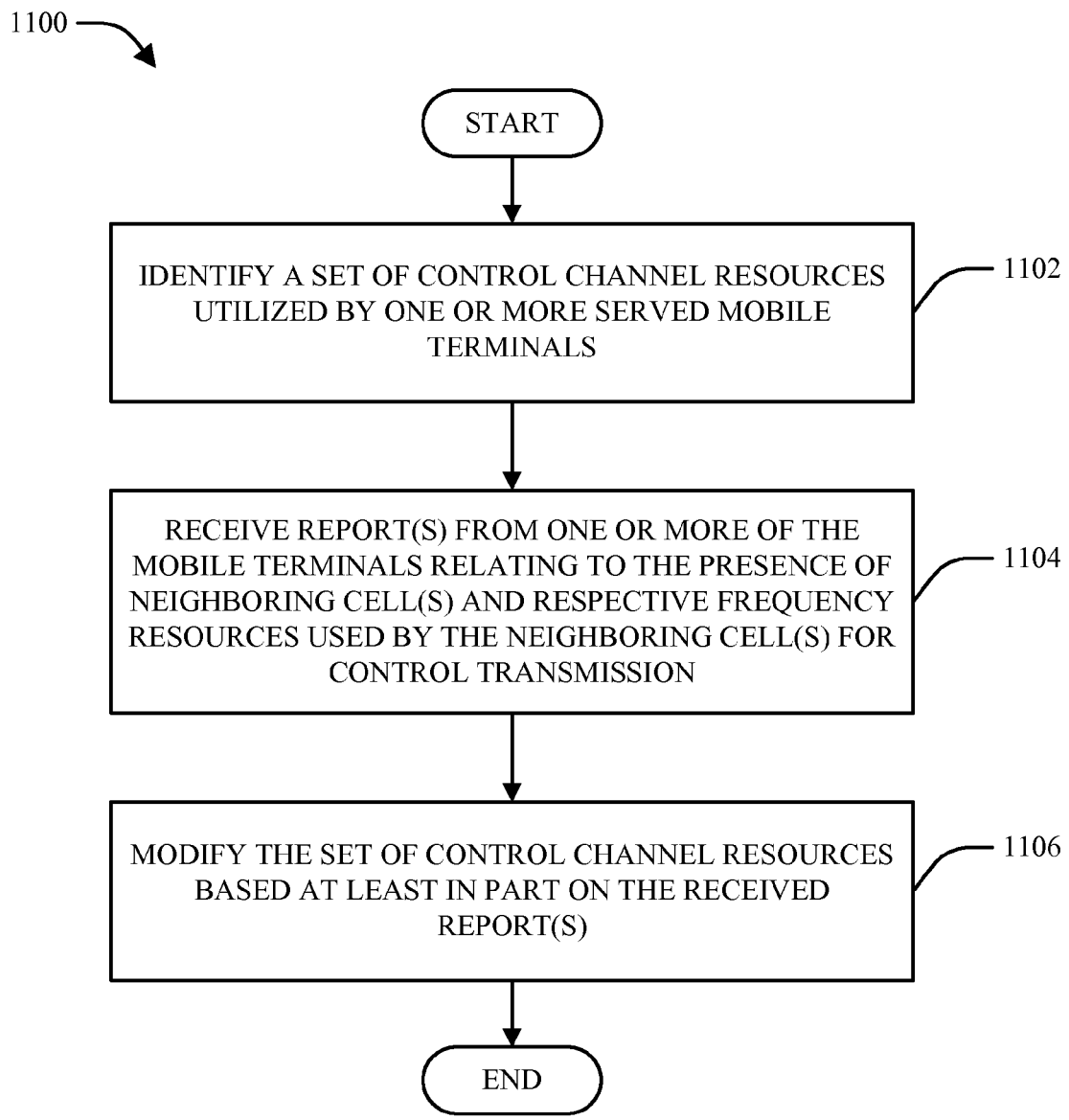
FIG. 11 is a flow diagram of a methodology for dynamically adjusting control resources to facilitate resource coordination in a wireless communication system.

Referring to FIG. 11, illustrated is a methodology 1100 for dynamically adjusting control resources to facilitate resource coordination in a wireless communication system. It is to be appreciated that methodology 1100 can be performed by, for example, a base station, a network management server, and/or any other appropriate network device. Methodology 1100 begins at block 1102, wherein a set of control channel resources utilized by one or more served mobile terminals (e.g., UE 110) is identified. Next, at block 1104, report(s) are received from one or more mobile terminals identified at block 1102 (e.g., via a channel reporting module 112) that relate to the presence of neighboring cell(s) and respective frequency resources used by the neighboring cell(s) for control transmission. Methodology 1100 can then conclude at block 1106, wherein the set of control channel resources identified at block 1102 is modified based at least in part on the report(s) received at block 1104.

Figure 12:
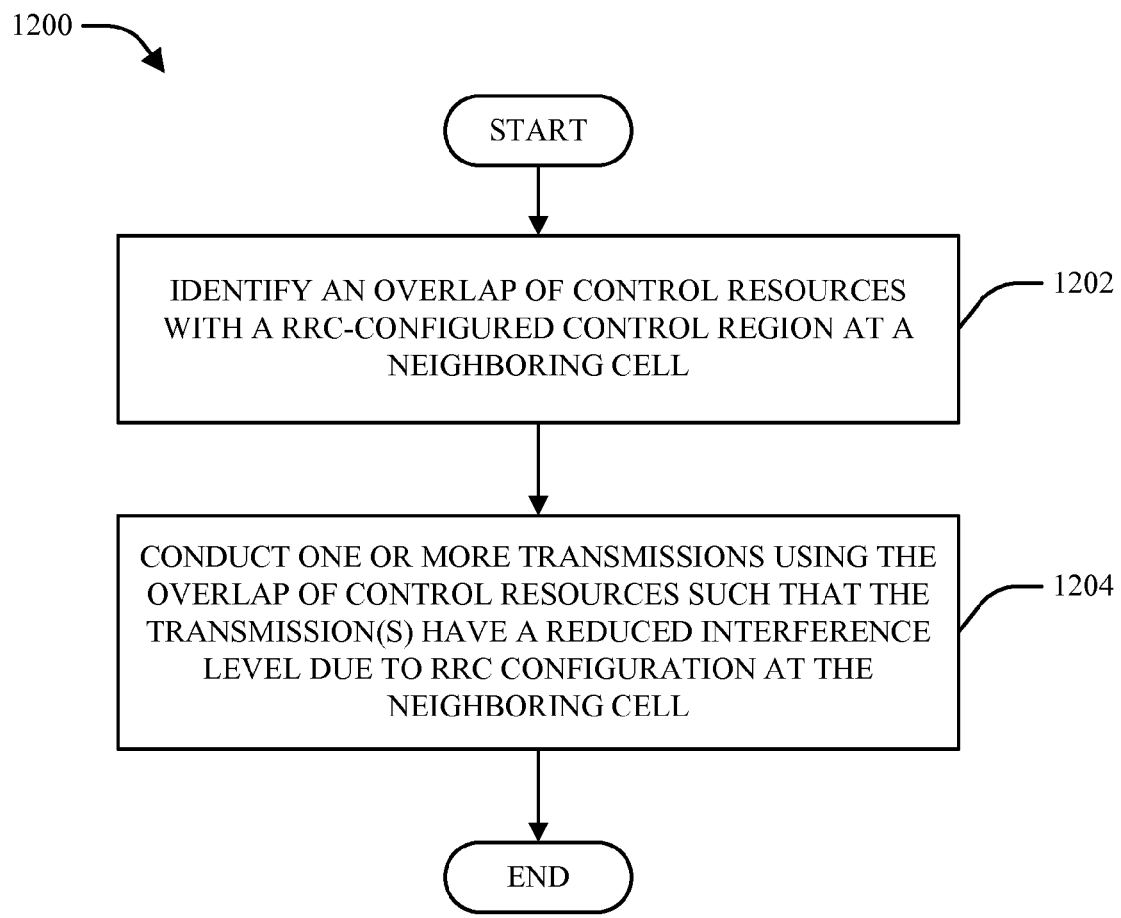
FIG. 12 is a flow diagram of a methodology for conducting uplink control transmission in a wireless communication system.

Turning now to FIG. 12, a flow diagram of a methodology 1200 for conducting control transmission in a wireless communication system is illustrated. Methodology 1200 can be performed by, for example, a UE (e.g. UE 110) and/or any other suitable network device. Methodology 1200 begins at block 1202, wherein an overlap of control resources with a RRC-configured control region at a neighboring cell (e.g., an eNB 130 distinct from a serving eNB 120) is identified. At block 1204, one or more transmissions are conducted using resources in the overlap of control resources identified at 1202 such that the transmission(s) have a reduced interference level due to RRC configuration at the neighboring cell. In accordance with one aspect, RRC configuration at the neighboring cell can be performed in accordance with one or more examples described above.

Figure 13:
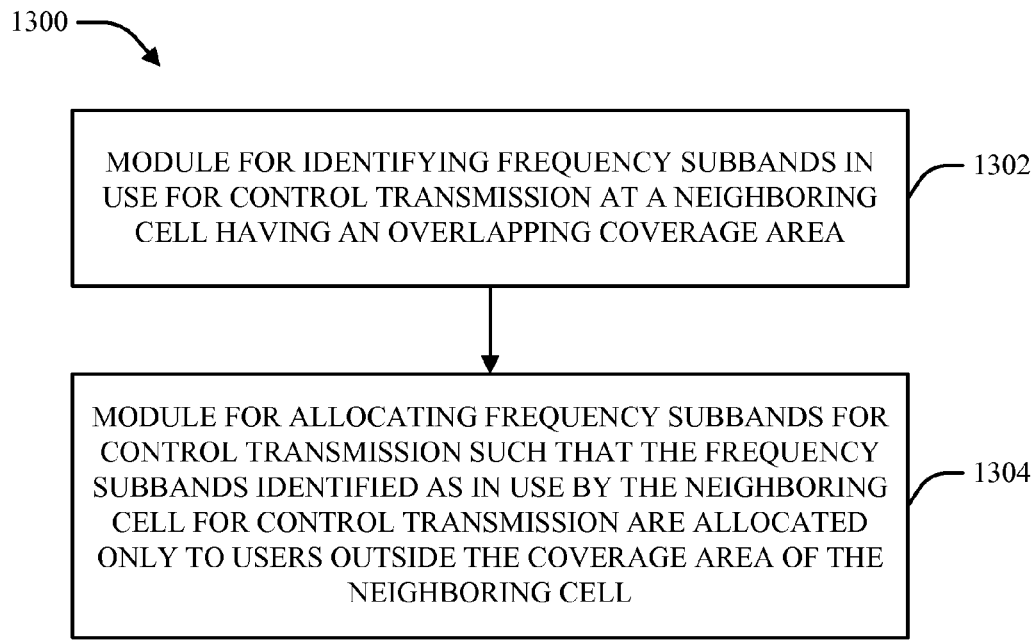
FIGS. 13-14 are block diagrams of respective apparatus that facilitate control resource management and coordination.

Referring next to FIG. 13, an apparatus 1300 that facilitates resource management and coordination is illustrated. It is to be appreciated that apparatus 1300 is represented as including functional blocks, which can be functional blocks that represent functions implemented by a processor, software, or combination thereof (e.g., firmware). Apparatus 1300 can be implemented by a base station (e.g., eNBs 120 and/or 130), a network management server (e.g., system controller 140), and/or another suitable network device and can include a module 1302 for identifying frequency subbands in use for control transmission at a neighboring cell having an overlapping coverage area and a module 1304 for allocating frequency subbands for control transmission such that the frequency subbands identified as in use by the neighboring cell for control transmission are allocated only to terminals outside the coverage area of the neighboring cell.

Figure 14:
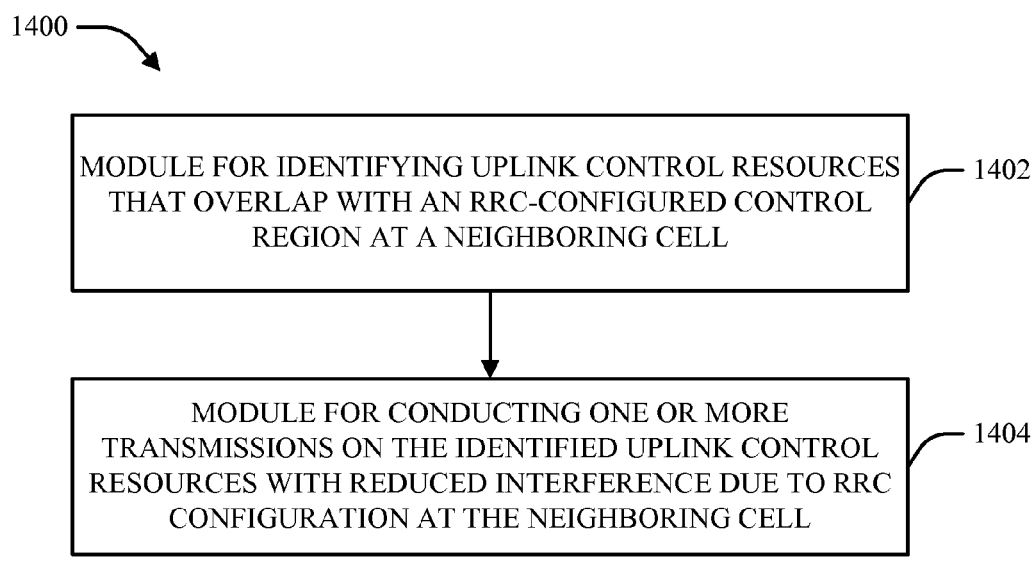

FIG. 14 illustrates another apparatus 1400 that facilitates resource management and coordination. Apparatus 1400 is represented as including functional blocks, which can be functional blocks that represent functions implemented by a processor, software, or combination thereof (e.g. firmware). Apparatus 1400 can be implemented by a UE (e.g., UE 110) and/or another suitable network device and can include a module 1402 for identifying one or more non-serving base stations to which access is restricted, a module 1404 for identifying uplink control resources that overlap with an RRC-configured control region at a neighboring cell and a module 1404 for conducting one or more transmissions on the identified uplink control resources with reduced interference due to RRC configuration at the neighboring cell.

Figure 15:
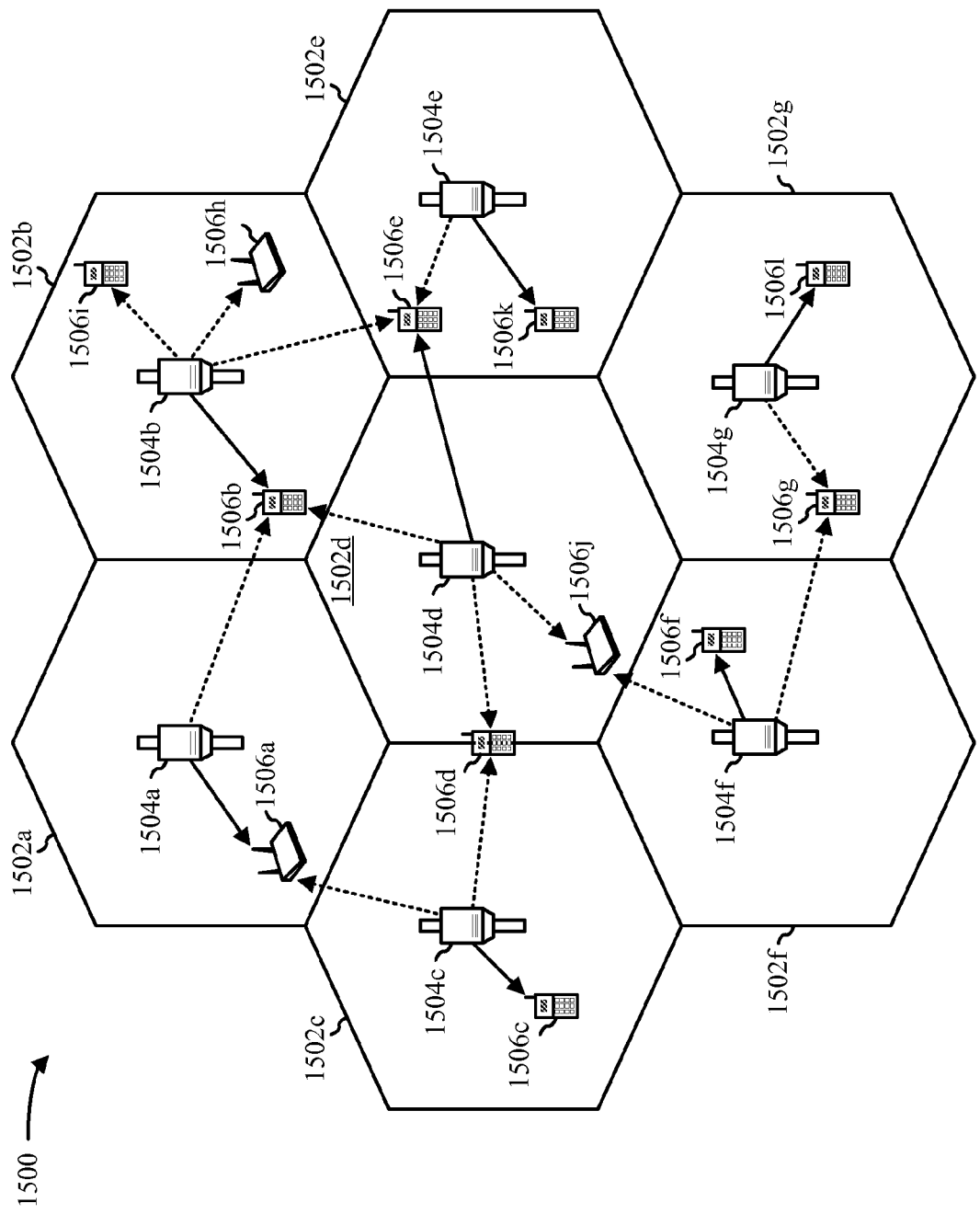
FIG. 15 illustrates an example wireless communication system in accordance with various aspects set forth herein.

Turning to FIG. 15, an exemplary wireless communication system 1500 is illustrated. In one example, system 1500 can be configured to support a number of users, in which various disclosed embodiments and aspects can be implemented. As shown in FIG. 15, by way of example, system 1500 can provide communication for multiple cells 1502, (e.g., macro cells 1502a-1502g), with respective cells being serviced by corresponding access points (AP) 1504 (e.g., APs 1504a-1504g). In one example, one or more cells can be further divided into respective sectors (not shown).

As FIG. 15 further illustrates, various access terminals (ATs) 1506, including ATs 1506a-1506k, can be dispersed throughout system 1500. In one example, an AT 1506 can communicate with one or more APs 1504 on a forward link (FL) and/or a reverse link (RL) at a given moment, depending upon whether the AT is active and whether it is in soft handoff and/or another similar state. As used herein and generally in the art, an AT 1506 can also be referred to as a user equipment (UE), a mobile terminal, and/or any other suitable nomenclature. In accordance with one aspect, system 1500 can provide service over a substantially large geographic region. For example, macro cells 1502a-1502g can provide coverage for a plurality of blocks in a neighborhood and/or another similarly suitable coverage area.

Figure 16:
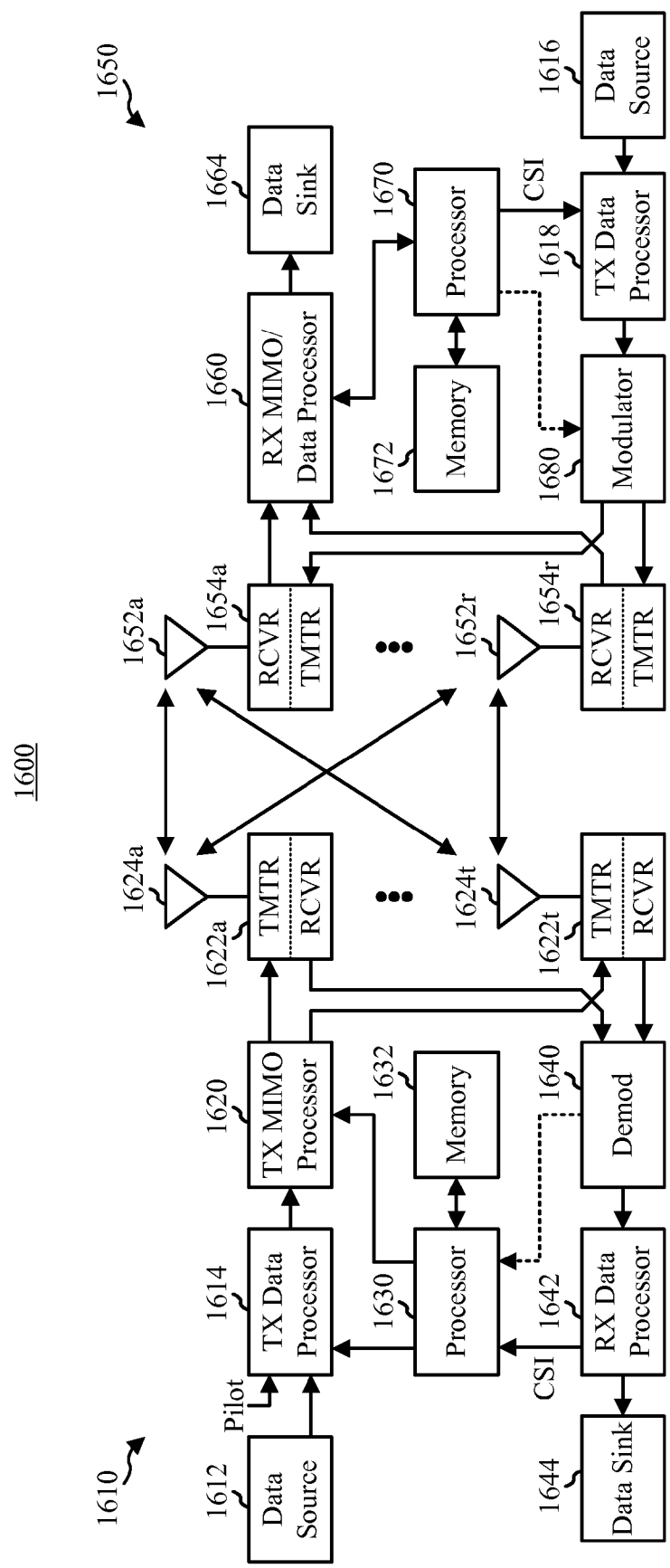
FIG. 16 is a block diagram illustrating an example wireless communication system in which various aspects described herein can function.

Referring now to FIG. 16, a block diagram illustrating an example wireless communication system 1600 in which various aspects described herein can function is provided. In one example, system 1600 is a multiple-input multiple-output (MIMO) system that includes a transmitter system 1610 and a receiver system 1650. It should be appreciated, however, that transmitter system 1610 and/or receiver system 1650 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1610 and/or receiver system 1650 described herein could be utilized in connection with a single output to single input antenna system.

In accordance with one aspect, traffic data for a number of data streams are provided at transmitter system 1610 from a data source 1612 to a transmit (TX) data processor 1614. In one example, each data stream can then be transmitted via a respective transmit antenna 1624. Additionally, TX data processor 1614 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1650 to estimate channel response. Back at transmitter system 1610, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1630.

Next, modulation symbols for all data streams can be provided to a TX processor 1620, which can further process the modulation symbols (e.g., for OFDM). TX MIMO processor 1620 can then provides NT modulation symbol streams to $N_T$ transceivers 1622a through 1622t. In one example, each transceiver 1622 can receive and process a respective symbol stream to provide one or more analog signals. Each transceiver 1622 can then further condition (e.g., amplify, filter, and upconvert) the analog signals to provide a modulated signal suitable for transmission over a MIMO channel.

Accordingly, $N_T$ modulated signals from transceivers 1622a through 1622t can then be transmitted from $N_T$ antennas 1624a through 1624t, respectively.

In accordance with another aspect, the transmitted modulated signals can be received at receiver system 1650 by $N_R$ antennas 1652a through 1652r. The received signal from each antenna 1652 can then be provided to respective transceivers 1654. In one example, each transceiver 1654 can condition (e.g., filter, amplify, and downconvert) a respective received signal, digitize the conditioned signal to provide samples, and then processes the samples to provide a corresponding "received" symbol stream. An RX MIMO/data processor 1660 can then receive and process the $N_R$ received symbol streams from $N_R$ transceivers 1654 based on a particular receiver processing technique to provide $N_T$ "detected" symbol streams. In one example, each detected symbol stream can include symbols that are estimates of the modulation symbols transmitted for the corresponding data stream. RX processor 1660 can then process each symbol stream at least in part by demodulating, deinterleaving, and decoding each detected symbol stream to recover traffic data for a corresponding data stream. Thus, the processing by RX processor 1660 can be complementary to that performed by TX MIMO processor 1620 and TX data processor 1616 at transmitter system 1610. RX processor 1660 can additionally provide processed symbol streams to a data sink 1664.

In accordance with one aspect, the channel response estimate generated by RX processor 1660 can be used to perform space/time processing at the receiver, adjust power levels, change modulation rates or schemes, and/or other appropriate actions. Additionally, RX processor 1660 can further estimate channel characteristics such as, for example, signal-to-noise-and-interference ratios (SNRs) of the detected symbol streams. RX processor 1660 can then provide estimated channel characteristics to a processor 1670. In one example, RX processor 1660 and/or processor 1670 can further derive an estimate of the "operating" SNR for the system. Processor 1670 can then provide channel state information (CSI), which can comprise information regarding the communication link and/or the received data stream. This information can include, for example, the operating SNR. The CSI can then be processed by a TX data processor 1618, modulated by a modulator 1680, conditioned by transceivers 1654a through 1654r, and transmitted back to transmitter system 1610. In addition, a data source 1616 at receiver system 1650 can provide additional data to be processed by TX data processor 1618.

Back at transmitter system 1610, the modulated signals from receiver system 1650 can then be received by antennas 1624, conditioned by transceivers 1622, demodulated by a demodulator 1640, and processed by a RX data processor 1642 to recover the CSI reported by receiver system 1650. In one example, the reported CSI can then be provided to processor 1630 and used to determine data rates as well as coding and modulation schemes to be used for one or more data streams. The determined coding and modulation schemes can then be provided to transceivers 1622 for quantization and/or use in later transmissions to receiver system 1650. Additionally and/or alternatively, the reported CSI can be used by processor 1630 to generate various controls for TX data processor 1614 and TX MIMO processor 1620. In another example, CSI and/or other information processed by RX data processor 1642 can be provided to a data sink 1644.

In one example, processor 1630 at transmitter system 1610 and processor 1670 at receiver system 1650 direct operation at their respective systems. Additionally, memory 1632 at transmitter system 1610 and memory 1672 at receiver system 1650 can provide storage for program codes and data used by processors 1630 and 1670, respectively. Further, at receiver system 1650, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 17:
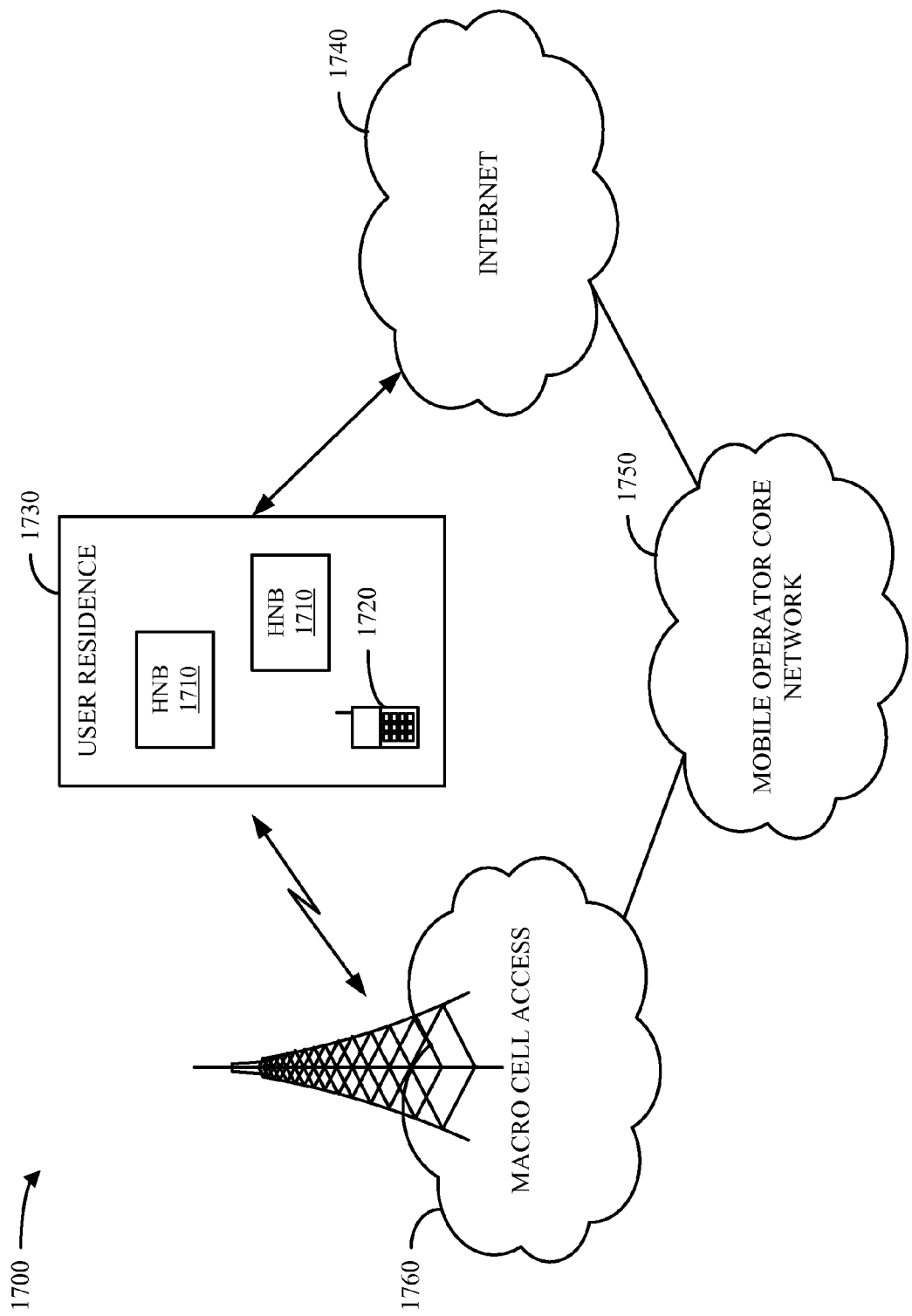
FIG. 17 illustrates an example communication system that enables deployment of access point base stations within a network environment.

FIG. 17 illustrates an example communication system 1700 that enables deployment of access point base stations within a network environment. As shown in FIG. 17, system 1700 can include multiple access point base stations (e.g., femto cells or Home Node B units (HNBs)) such as, for example, HNBs 1710. In one example, respective HNBs 1710 can be installed in a corresponding small scale network environment, such as, for example, one or more user residences 1730. Further, respective HNBs 1710 can be configured to serve associated and/or alien UE(s) 1720. In accordance with one aspect, respective HNBs 1710 can be coupled to the Internet 1740 and a mobile operator core network 1750 via a DSL router, a cable modem, and/or another suitable device (not shown). In accordance with one aspect, an owner of a femto cell or HNB 1710 can subscribe to mobile service, such as, for example, 3G/4G mobile service, offered through mobile operator core network 1750. Accordingly, UE 1720 can be enabled to operate both in a macro cellular environment 1760 and in a residential small scale network environment.

In one example, UE 1720 can be served by a set of Femto cells or HNBs 1710 (e.g., HNBs 1710 that reside within a corresponding user residence 1730) in addition to a macro cell mobile network 1760. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 1710 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of wireless communication at a cell, comprising:
    identifying a network cell and a set of control resources associated with the network cell;
    allocating a set of control resources, wherein at least a portion of the allocated set of control resources overlaps at least a portion of the set of control resources associated with the identified network cell; and
    selecting control resources for subsequent use from among the allocated set of control resources such that the selected control resources are substantially free from interference caused by the set of control resources associated with the identified network cell,
    wherein the set of control resources associated with the identified network cell corresponds to a user equipment (UE)-specific and Radio Resource Control (RRC)/Layer 3 (L3) configurable control region, the UE-specific and RRC/L3 configurable control region comprising resources for one or more of Channel Quality Indicator (CQI), Scheduling Request (SR), and persistent Acknowledgement (ACK) transmission.

2. The method of claim 1, wherein the control resources correspond to a Physical Uplink Control Channel (PUCCH).

3. The method of claim 1, wherein the control resources associated with the identified network cell and the allocated control resources comprise resources located at one or more edges of a system bandwidth.

4. The method of claim 1, wherein the control resources associated with the identified network cell and the allocated control resources comprise resources that are substantially centrally located within a system bandwidth.

5. The method of claim 1, further comprising:
    identifying a coverage area overlap with the identified network cell; and
    identifying one or more user equipment units (UEs) located within the coverage area overlap.

6. The method of claim 5, wherein the allocating comprises allocating a first control resource portion that coincides with at least a portion of the control resources associated with the identified network cell and a second control resource portion that is substantially non-overlapping with the control resources of the identified network cell, and the method further comprises:
    identifying a UE to be assigned control resources;
    determining whether the identified UE is within a specified range of the identified network cell; and
    assigning resources to the identified UE from the first control resource portion or the second control resource portion if the identified UE is outside the specified range of the identified network cell or from the second control resource portion if the identified UE is within the specified range of the identified network cell.

7. The method of claim 6, wherein the determining comprises:
    obtaining an indication from the identified UE relating to an observed signal strength of the identified network cell;
    comparing the observed signal strength obtained from the identified UE to a threshold value; and
    inferring that the identified UE is within the specified range of the identified network cell if the observed signal strength obtained from the identified UE exceeds the threshold value.

8. The method of claim 7, wherein the identifying a network cell and a set of control resources associated with the network cell comprises receiving a report from the identified UE that comprises information relating to at least one network cell and control resources used by the at least one network cell.

9. The method of claim 6, wherein the identified network cell is a Home Node B (HNB) for which access by the identified UE is restricted.

10. The method of claim 1, wherein:
    the allocating comprises:
    allocating a first control resource portion that coincides with the control resources associated with the identified network cell, and
    allocating a second control resource portion that coincides with at least a portion of data resources associated with the identified network cell; and
    the selecting comprises selecting the second control resource portion for subsequent use.

11. The method of claim 1, wherein:
    the allocating comprises:
    allocating a first control resource portion that coincides with the control resources associated with the identified network cell and at least a portion of random access resources associated with the identified network cell, and
    allocating a second control resource portion that coincides with at least a portion of data resources associated with the identified network cell; and
    the selecting comprises selecting the second control resource portion for subsequent use.

12. The method of claim 1, further comprising:
    identifying a set of data resources that coincide with control resources associated with the identified network cell; and
    scheduling one or more transmissions on the identified set of data resources such that control transmissions by the identified network cell conducted over the set of control resources associated with the identified network cell are substantially free from interference caused by the one or more scheduled transmissions.

13. The method of claim 12, wherein the scheduling one or more transmissions comprises scheduling the one or more transmissions on the identified set of data resources for one or more UEs outside the identified network cell.

14. The method of claim 1, wherein the allocating comprises receiving a control resource allocation from the management server.

15. The method of claim 1, wherein the selecting comprises receiving a control resource selection from the management server.

16. The method of claim 1, wherein at least one of the allocation and the selection is made based on at least one of a report received from a user equipment (UE) and a control resource allocation received from a management server, the management server being external to the cell and external to the network cell.

17. A wireless communications apparatus for wireless communication at a cell, comprising:
    a memory that stores data relating to a neighboring network cell, a set of control resources used by the neighboring network cell, a system frequency band, and at least one terminal; and
    a processor configured to allocate control resources in the system frequency band such that the allocated control resources at least partially overlap the control resources used by the neighboring network cell and to select control resources for assignment to the at least one terminal such that the selected control resources are substantially free from interference from the control resources used by the neighboring network cell, wherein the set of control resources associated with the identified network cell corresponds to a user equipment (UE)-specific and Radio Resource Control (RRC)/Layer 3 (L3) configurable control region, the UE-specific and RRC/L3 configurable control region comprising resources for one or more of Channel Quality Indicator (CQI), Scheduling Request (SR), and persistent Acknowledgement (ACK) transmission.

18. The wireless communications apparatus of claim 17, wherein the allocated control resources correspond to a Physical Uplink Control Channel (PUCCH).

19. The wireless communications apparatus of claim 17, wherein the control resources used by the neighboring network cell and the control resources allocated by the processor comprise resources located at one or more edges of the system frequency band.

20. The wireless communications apparatus of claim 17, wherein the control resources used by the neighboring network cell and the control resources allocated by the processor comprise resources located substantially near a center of the system frequency band.

21. The wireless communications apparatus of claim 17, wherein the at least one terminal is located in an overlap between a coverage area of the wireless communications apparatus and a coverage area of the neighboring network cell.

22. The wireless communications apparatus of claim 21, wherein the processor is further configured to:
    divide the allocated control resources into a first portion that coincides with at least a portion of the control resources used by the neighboring network cell and a second control resource portion that is substantially non-overlapping with the control resources used by the neighboring network cell,
    determine whether the at least one terminal is located within a specified range of the neighboring network cell,
    assign control resources from the first portion or the second portion of the allocated control resources if the at least one terminal is outside the specified range of the neighboring network cell, and
    assign control resources from the second portion of the allocated control resources if the at least one terminal is within the specified range of the neighboring network cell.

23. The wireless communications apparatus of claim 22, wherein the processor is further configured to receive an indication from the at least one terminal relating to signal strength of the neighboring network cell as observed by the at least one terminal and to determine whether the at least one terminal is within the specified range of the neighboring network cell based at least in part on the indication.

24. The wireless communications apparatus of claim 22, wherein the neighboring network cell is a Home Node B (HNB) for which access by the at least one terminal is restricted.

25. The wireless communications apparatus of claim 17, wherein the processor is further configured to allocate an unused portion of control resources that corresponds to the control resources used by the neighboring network cell and to allocate an active portion of control resources that corresponds to at least a portion of data resources used by the neighboring network cell.

26. The wireless communications apparatus of claim 25, wherein the unused portion of control resources further corresponds to a set of random access resources used by the neighboring network cell.

27. The wireless communications apparatus of claim 17, wherein the memory further stores data relating to a set of data resources that coincide with control resources used by the neighboring network cell and the processor is further configured to schedule one or more transmissions on the set of data resources such that interference with one or more transmissions conducted by the neighboring network cell over the control resources used by the neighboring network cell is substantially avoided.

28. The wireless communications apparatus of claim 17, wherein the processor is further configured to receive a control resource allocation from the network management entity.

29. The wireless communications apparatus of claim 17, wherein at least one of the allocation and the selection is made based on at least one of a report received from a user equipment (UE) and a control resource allocation received from a management server, the management server being external to the cell and external to the network cell.

30. An apparatus for wireless communication at a cell, comprising:
    means for identifying frequency subbands in use for control transmission at a neighboring cell having a coverage area that overlaps a coverage area associated with the apparatus; and
    means for allocating frequency subbands for control transmission such that the frequency subbands identified as in use for control transmission by the neighboring cell are allocated only to users outside the coverage area of the neighboring cell, wherein the set of control resources associated with the identified network cell corresponds to a user equipment (UE)-specific and Radio Resource Control (RRC)/Layer 3 (L3) configurable control region, the UE-specific and RRC/L3 configurable control region comprising resources for one or more of Channel Quality Indicator (CQI), Scheduling Request (SR), and persistent Acknowledgement (ACK) transmission.

31. The apparatus of claim 30, wherein the frequency subbands identified as in use for control transmission by the neighboring cell and the allocated frequency subbands correspond to a Physical Uplink Control Channel (PUCCH).

32. The apparatus of claim 30, wherein the frequency subbands identified as in use for control transmission by the neighboring cell and the allocated frequency subbands occupy one or more edges of an overall system bandwidth.

33. The apparatus of claim 30, wherein the frequency subbands identified as in use for control transmission by the neighboring cell and the allocated frequency subbands occupy a central region of an overall system bandwidth.

34. The apparatus of claim 30, wherein the means for allocating further comprises:
    means for dividing a set of frequency subbands for control transmission into a first subset that corresponds to at least a portion of the frequency subbands in use for control transmission at the neighboring cell and a second subset that is substantially non-overlapping with the frequency subbands in use for control transmission at the neighboring cell;
    means for allocating frequency subbands from the first subset or the second subset to one or more users outside a predetermined range of the neighboring cell; and
    means for allocating frequency subbands from the second subset to one or more users within the predetermined range of the neighboring cell.

35. The apparatus of claim 34, further comprising:
    means for receiving an indication from a user relating to observed signal strength of the neighboring cell; and
    means for determining whether the user is within the predetermined range of the neighboring cell based at least in part on the indication.

36. The apparatus of claim 35, wherein the neighboring cell is served by a Home Node B (HNB) for which access is restricted to the at least one user from which the indication is received.

37. The apparatus of claim 30, wherein the means for allocating comprises:
    means for allocating unused frequency subbands corresponding to the frequency subbands in use at the neighboring cell for control transmission; and
    means for allocating frequency subbands for control transmission corresponding to at least a subset of frequency subbands in use at the neighboring cell for data transmission.

38. The apparatus of claim 37, wherein the means for allocating further comprises means for allocating unused frequency subbands corresponding to frequency subbands in use at the neighboring cell for random access transmission.

39. The apparatus of claim 30, further comprising:
    means for identifying frequency subbands for data transmission that coincide with the frequency subbands in use for control transmission at the neighboring cell; and
    means for scheduling one or more transmissions on the identified frequency subbands for data transmission such that interference with control transmissions at the neighboring cell is substantially avoided.

40. The wireless communications apparatus of claim 30, wherein at least one of the allocation and the selection is made based on at least one of a report received from a user equipment (UE) and a control resource allocation received from a management server, the management server being external to the cell and external to the network cell.

41. A computer program product, comprising:
    a non-transitory computer-readable medium, comprising:
    code for causing a computer to identify an Evolved Node B (eNB) and a set of control resources used by the eNB;
    code for causing the computer to reserve control resources for a cell such that at least a portion of the reserved control resources overlap with the control resources used by the eNB; and
    code for causing the computer to allocate reserved control resources to at least one user such that control transmissions conducted by the eNB are substantially free from interference caused by control transmissions conducted by the at least one user over the allocated control resources, wherein the set of control resources associated with the identified network cell corresponds to a user equipment (UE)-specific and Radio Resource Control (RRC)/Layer 3 (L3) configurable control region, the UE-specific and RRC/L3 configurable control region comprising resources for one or more of Channel Quality Indicator (CQI), Scheduling Request (SR), and persistent Acknowledgement (ACK) transmission.

42. The computer program product of claim 41, wherein the set of control resources used by the eNB and the reserved control resources correspond to a Physical Uplink Control Channel (PUCCH).

43. The computer program product of claim 41, wherein the code for causing a computer to allocate comprises:
   code for causing a computer to determine whether the at least one user is within a predetermined distance of the eNB; and
   code for allocating reserved control resources to the at least one user that correspond to a frequency at which the eNB does not conduct control transmission upon a determination that the at least one user is within the predetermined distance of the eNB.

44. The computer program product of claim 43, wherein the code for causing a computer to determine whether the at least one user is within a predetermined distance of the eNB comprises:
   code for causing a computer to receive an indication from the at least one user relating to observed signal strength of the eNB; and
   code for causing a computer to determine whether the at least one user is within the predetermined distance of the eNB based at least in part on the indication.

45. The computer program product of claim 43, wherein the eNB is a Home Node B (HNB) for which access is restricted to the at least one user.

46. The computer program product of claim 41, wherein the code for causing a computer to reserve comprises:
   code for causing a computer to reserve unused resources corresponding to the control resources used by the eNB; and
   code for causing a computer to reserve active control resources corresponding to at least a subset of data resources used by the eNB.

47. The computer program product of claim 46, wherein the code for causing a computer to reserve further comprises code for causing a computer to reserve unused resources corresponding to random access resources used by the eNB.

48. The computer program product of claim 41, wherein the computer-readable medium further comprises:
   code for causing a computer to identify a set of data resources that coincides with control resources used by the eNB; and
   code for causing a computer to schedule one or more data transmissions on the identified data resources such that interference with control transmissions by the eNB is substantially avoided.

49. The computer program product of clam 41, wherein at least one of the allocation and the selection is made based on at least one of a report received from a user equipment (UE) and a control resource allocation received from a management server, the management server being external to the cell and external to the network cell.

50. An integrated circuit that executes computer-executable instructions for wireless communication at a cell, the instructions comprising:
   identifying a neighboring cell;
   reserving a set of control resources from a system bandwidth; and
   allocating reserved control resources to respective users such that control transmissions conducted by the neighboring cell are substantially free from interference caused by control transmissions by the respective users over the allocated control resources, wherein the set of control resources associated with the identified network cell corresponds to a user equipment (UE)-specific and Radio Resource Control (RRC)/Layer 3 (L3) configurable control region, the UE-specific and RRC/L3 configurable control region comprising resources for one or more of Channel Quality Indicator (CQI), Scheduling Request (SR), and persistent Acknowledgement (ACK) transmission.

51. The integrated circuit of claim 50, wherein the allocating comprises:
   determining whether a user is outside of a predetermined range from the neighboring cell; and
   allocating reserved control resources to the user corresponding to a frequency at which the neighboring cell does not perform control transmissions upon determining that the user is inside of the predetermined range from the neighboring cell.

52. The integrated circuit of claim 51, wherein the determining comprises:
   receiving an observed signal strength indication from the user relating to the neighboring cell; and
   determining whether the user is inside of the predetermined range of the neighboring cell at least in part by comparing the indicated observed signal strength to a threshold signal strength.

53. The integrated circuit of claim 50, wherein the neighboring cell is served by a restricted association access point with which at least one of the respective users is not authorized to associate.

54. The integrated circuit of claim 50, wherein the reserving comprises:
   reserving unused resources corresponding to one or more frequencies at which the neighboring cell conducts control transmission; and
   reserving control resources corresponding to one or more frequencies at which the neighboring cell conducts data transmission.

55. The integrated circuit of claim 54, wherein the reserving further comprises reserving control resources corresponding to one or more frequencies at which the neighboring cell conducts random access transmission.

56. The integrated circuit of claim 50, wherein the instructions further comprise:
   reserving a set of data resources from the system bandwidth;
   identifying a subset of the reserved data resources that correspond to one or more frequencies at which the neighboring cell conducts control transmission; and
   scheduling one or more data transmissions on the identified subset of data resources such that interference with control transmissions by the neighboring cell is substantially avoided.

57. The integrated circuit of claim 50, wherein at least one of the allocation and the selection is made based on at least one of a report received from a user equipment (UE) and a control resource allocation received from a management server, the management server being external to the cell and external to the network cell.

58. A method, comprising:
   identifying an overlap of control resources with a Radio Resource Control (RRC)-configured control region at a neighboring cell disparate from a serving cell;

transmitting a report to at least one of the neighboring cell and the serving cell, wherein the report comprises an indication of the neighboring cell and the serving cell and at least one of observed signal strengths associated with the respective cells and control frequencies of the respective cells; and conducting one or more transmissions from a user equipment using resources in the overlap of control resources such that the one or more transmissions have a reduced interference level due to RRC configuration at the neighboring cell.

59. The method of claim 58, wherein at least a portion of resources in the overlap of control resources corresponds to a Physical Uplink Control Channel (PUCCH).

60. The method of claim 59, wherein the conducting comprises conducting one or more PUCCH transmissions using resources in the overlap of control resources.

61. The method of claim 58, wherein the neighboring cell is a Home Node B (HNB).

62. The method of claim 61, wherein access is restricted to the HNB.

63. A wireless communications apparatus, comprising:
a memory that stores data relating to a set of control resources that overlaps with a Radio Resource Control (RRC)-configured set of control resources at a non-serving Evolved Node B (eNB); and
a processor configured to transmit a report to at least one of the neighboring cell and the serving cell, wherein the report comprises an indication of the neighboring cell and the serving cell and at least one of observed signal strengths associated with the respective cells and control frequencies of the respective cells and to conduct at least one communication from a user equipment using the set of control resources stored by the memory such that the at least one transmission has reduced interference due to RRC configuration at the non-serving eNB.

64. The wireless communications apparatus of claim 63, wherein the set of control resources stored by the memory corresponds to a Physical Uplink Control Channel (PUCCH) and the at least one communication conducted by the processor comprises one or more PUCCH transmissions.

65. The wireless communications apparatus of claim 63, wherein the non-serving eNB is a femto cell.

66. The wireless communications apparatus of claim 63, wherein the wireless communications apparatus is restricted from accessing the non-serving eNB.

67. An apparatus, comprising:
means for identifying uplink control resources that overlap with a Radio Resource Control (RRC)-configured control region at a neighboring non-serving cell;
means for transmitting a report to at least one of the neighboring cell and the serving cell, wherein the report comprises an indication of the neighboring cell and the serving cell and at least one of observed signal strengths associated with the respective cells and control frequencies of the respective cells; and
means for conducting one or more transmissions from a user equipment on the identified uplink control resources with reduced interference due to RRC configuration at the neighboring non-serving cell.

68. The apparatus of claim 67, wherein at least a portion of the identified uplink control resources corresponds to a Physical Uplink Control Channel (PUCCH).

69. The apparatus of claim 68, wherein the means for conducting comprises means for conducting one or more PUCCH transmissions using identified uplink control resources.

70. The apparatus of claim 67, wherein the neighboring non-serving cell comprises a Home Node B (HNB).

71. The apparatus of claim 70, wherein the HNB restricts access from the apparatus.

72. A computer program product, comprising:
a non-transitory computer-readable medium, comprising:
code for causing a computer to identify control resources that overlap with a Radio Resource Control (RRC)-configured control region at a neighboring non-serving cell;
code for causing the computer to transmit a report to at least one of the neighboring cell and the serving cell, wherein the report comprises an indication of the neighboring cell and the serving cell and at least one of observed signal strengths associated with the respective cells and control frequencies of the respective cells; and
code for causing the computer to perform at least one Physical Uplink Control Channel (PUCCH) transmission from a user equipment on the identified control resources with reduced interference due to RRC configuration at the neighboring non-serving cell.

73. The computer program product of claim 72, wherein the neighboring non-serving cell comprises a Home Node B (HNB).

74. The computer program product of claim 72, wherein association with the HNB is restricted.

75. An integrated circuit that executes computer-executable instructions, the instructions comprising:
obtaining information relating to a set of control resources that overlaps with a Radio Resource Control (RRC)-configured set of control resources at a non-serving Evolved Node B (eNB);
transmitting a report to at least one of the neighboring cell and the serving cell, wherein the report comprises an indication of the neighboring cell and the serving cell and at least one of observed signal strengths associated with the respective cells and control frequencies of the respective cells; and
conducting at least one communication from a user equipment using the set of control resources for which information is obtained such that the at least one transmission has reduced interference due to RRC configuration at the non-serving eNB.

76. The integrated circuit of claim 75, wherein the obtaining information comprises obtaining information relating to a Physical Uplink Control Channel (PUCCH).

77. The integrated circuit of claim 76, wherein the conducting comprises conducting at least one PUCCH transmission using the set of control resources for which information is obtained.

78. The integrated circuit of claim 75, wherein the non-serving eNB is a femto cell for which access is restricted.

79. A method, comprising:
identifying a network cell and a set of control resources associated with the network cell;
allocating a set of control resources, wherein at least a portion of the allocated set of control resources overlaps at least a portion of the set of control resources associated with the identified network cell;
selecting control resources for subsequent use from among the allocated set of control resources such that the selected control resources are substantially free from interference caused by the set of control resources associated with the identified network cell;
identifying a coverage area overlap with the identified network cell; and identifying one or more user equipment units (UEs) located within the coverage area overlap,
wherein the allocating comprises allocating a first control resource portion that coincides with at least a portion of the control resources associated with the identified network cell and a second control resource portion that is substantially non-overlapping with the control resources of the identified network cell, and the method further comprises:
identifying a UE to be assigned control resources;
determining whether the identified UE is within a specified range of the identified network cell; and
assigning resources to the identified UE from the first control resource portion or the second control resource portion if the identified UE is outside the specified range of the identified network cell or from the second control resource portion if the identified UE is within the specified range of the identified network cell.

80. A wireless communications apparatus, comprising:
a memory that stores data relating to a neighboring network cell, a set of control resources used by the neighboring network cell, a system frequency band, and at least one terminal; and
a processor configured to:
allocate control resources in the system frequency band such that the allocated control resources at least partially overlap the control resources used by the neighboring network cell and to select control resources for assignment to the at least one terminal such that the selected control resources are substantially free from interference from the control resources used by the neighboring network cell, wherein the at least one terminal is located in an overlap between a coverage area of the wireless communications apparatus and a coverage area of the neighboring network cell,
divide the allocated control resources into a first portion that coincides with at least a portion of the control resources used by the neighboring network cell and a second control resource portion that is substantially non-overlapping with the control resources used by the neighboring network cell,
determine whether the at least one terminal is located within a specified range of the neighboring network cell,
assign control resources from the first portion or the second portion of the allocated control resources if the at least one terminal is outside the specified range of the neighboring network cell, and
assign control resources from the second portion of the allocated control resources if the at least one terminal is within the specified range of the neighboring network cell.

81. An apparatus, comprising:
means for identifying frequency subbands in use for control transmission at a neighboring cell having a coverage area that overlaps a coverage area associated with the apparatus; and
means for allocating frequency subbands for control transmission such that the frequency subbands identified as in use for control transmission by the neighboring cell are allocated only to users outside the coverage area of the neighboring cell, wherein the means for allocating further comprises:
means for dividing a set of frequency subbands for control transmission into a first subset that corresponds to at least a portion of the frequency subbands in use for control transmission at the neighboring cell and a second subset that is substantially non-overlapping with the frequency subbands in use for control transmission at the neighboring cell;
means for allocating frequency subbands from the first subset or the second subset to one or more users outside a predetermined range of the neighboring cell; and
means for allocating frequency subbands from the second subset to one or more users within the predetermined range of the neighboring cell.

* * * * *